(12) United States Patent
Chen et al.

(10) Patent No.: US 10,175,454 B2
(45) Date of Patent: Jan. 8, 2019

(54) PHOTOGRAPHING LENS ASSEMBLY, IMAGE CAPTURING UNIT AND ELECTRONIC DEVICE

(71) Applicant: LARGAN Precision Co., Ltd., Taichung (TW)

(72) Inventors: Hung-Shuo Chen, Taichung (TW); Wei-Yu Chen, Taichung (TW); Chun-Yen Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/782,448

(22) Filed: Oct. 12, 2017

(65) Prior Publication Data

US 2018/0356613 A1    Dec. 13, 2018

(30) Foreign Application Priority Data

Jun. 7, 2017 (TW) .............................. 106118942 A

(51) Int. Cl.
| | |
|---|---|
| *G02B 9/62* | (2006.01) |
| *G02B 7/04* | (2006.01) |
| *G02B 15/14* | (2006.01) |
| *G02B 13/00* | (2006.01) |

(52) U.S. Cl.
CPC ............... *G02B 9/62* (2013.01); *G02B 7/04* (2013.01); *G02B 13/0045* (2013.01); *G02B 15/14* (2013.01)

(58) Field of Classification Search
CPC ....................................................... G02B 9/62

USPC ......................................................... 359/713
See application file for complete search history.

(56) References Cited

U.S. PATENT DOCUMENTS

| | | |
|---|---|---|
| 8,953,261 B2 | 2/2015 | Tsai |
| 9,279,958 B2 | 3/2016 | Noda et al. |
| 9,366,846 B2 | 6/2016 | Chen et al. |
| 9,374,513 B2 | 6/2016 | Chen et al. |
| 9,541,737 B2 | 1/2017 | Chen et al. |
| 9,557,534 B1 | 1/2017 | Liao et al. |
| 2015/0346460 A1 | 12/2015 | Chen et al. |
| 2016/0124185 A1 | 5/2016 | Tang et al. |
| 2016/0139366 A1 | 5/2016 | Jung |
| 2016/0154210 A1 | 6/2016 | Baik et al. |
| 2016/0259150 A1 | 9/2016 | Shin et al. |
| 2016/0341928 A1 | 11/2016 | Liu et al. |

(Continued)

FOREIGN PATENT DOCUMENTS

| | | |
|---|---|---|
| CN | 205003346 U | 1/2016 |
| CN | 205049802 U | 2/2016 |

*Primary Examiner* — James Jones
(74) *Attorney, Agent, or Firm* — Hanley, Flight & Zimmerman, LLC

(57) ABSTRACT

A photographing lens assembly includes six lens elements which are, in order from an object side to an image side: a first lens element, a second lens element, a third lens element, a fourth lens element, a fifth lens element and a sixth lens element. The first lens element with negative refractive power has an image-side surface being concave in a paraxial region thereof. The sixth lens element has an image-side surface being concave in a paraxial region thereof, wherein the image-side surface of the sixth lens element has at least one convex critical point in an off-axis region thereof, and both an object-side surface and the image-side surface of the sixth lens element are aspheric.

22 Claims, 21 Drawing Sheets

(56) References Cited

U.S. PATENT DOCUMENTS

| | | |
|---|---|---|
| 2016/0341933 A1 | 11/2016 | Liu et al. |
| 2016/0341935 A1 | 11/2016 | Chen et al. |
| 2016/0377839 A1* | 12/2016 | Chen .................. G02B 9/64 359/708 |
| 2017/0031133 A1 | 2/2017 | Liu et al. |
| 2017/0031134 A1 | 2/2017 | Liu et al. |
| 2017/0031135 A1 | 2/2017 | Tang et al. |
| 2017/0031136 A1 | 2/2017 | Tang et al. |
| 2017/0045716 A1 | 2/2017 | Tang et al. |
| 2017/0052345 A1 | 2/2017 | Tang et al. |
| 2017/0052346 A1 | 2/2017 | Tang et al. |
| 2017/0052347 A1 | 2/2017 | Tang et al. |
| 2017/0052348 A1 | 2/2017 | Tang et al. |
| 2017/0059819 A1 | 3/2017 | Liu et al. |
| 2017/0059820 A1 | 3/2017 | Tang et al. |
| 2017/0059821 A1 | 3/2017 | Liu et al. |
| 2017/0059822 A1 | 3/2017 | Tang et al. |

\* cited by examiner

PHOTOGRAPHING LENS ASSEMBLY, IMAGE CAPTURING UNIT AND ELECTRONIC DEVICE

RELATED APPLICATIONS

This application claims priority under 35 U.S.C. § 119 to Taiwan Application 106118942, filed Jun. 7, 2017, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, an electronic device equipped with one or more optical systems has become the mainstream product in the market. For various applications, the optical systems are developed with various optical characteristics, and have been widely applied to different kinds of smart electronic devices, such as vehicle devices, image recognition systems, entertainment devices, sport devices and intelligent home assistance systems, for various requirements.

In a conventional wide angle camera, the lens group close to the object side of the optical system has negative refractive power, and another lens group close to the image side of the optical system has positive refractive power. Such arrangement of the refractive power distribution results in overly long back focal length so as to be unfavorable for the compactness of a wide angle camera. To reduce the back focal length, the first lens element with positive refractive power may be arranged in the optical system; however, the positive refractive power of the first lens element narrows the field of view so that it is ineffective for adaptations in wide angle and fisheye cameras. Thus, there is a need to develop an optical system with proper refractive power distribution for simultaneously satisfying the requirements of a wide view angle, compactness and high image quality.

SUMMARY

According to one aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The first lens element with negative refractive power has an image-side surface being concave in a paraxial region thereof. The sixth lens element has an image-side surface being concave in a paraxial region thereof, wherein the image-side surface of the sixth lens element has at least one convex critical point in an off-axis region thereof, and both an object-side surface and the image-side surface of the sixth lens element are aspheric. When a focal length of the photographing lens assembly is f, a focal length of the third lens element is f3, a focal length of the fifth lens element is f5, a composite focal length of the first lens element, the second lens element and the third lens element is f123, a composite focal length of the fourth lens element, the fifth lens element and the sixth lens element is f456, an axial distance between an object-side surface of the first lens element and the image-side surface of the sixth lens element is Td, and an axial distance between the image-side surface of the sixth lens element and an image surface is BL, the following conditions are satisfied:

$f/f456<0<f/f123$, $10<Td/BL$, and $0.60<f3/f5$.

According to another aspect of the present disclosure, an image capturing unit includes the aforementioned photographing lens assembly and an image sensor, wherein the image sensor is disposed on the image surface of the photographing lens assembly.

According to still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
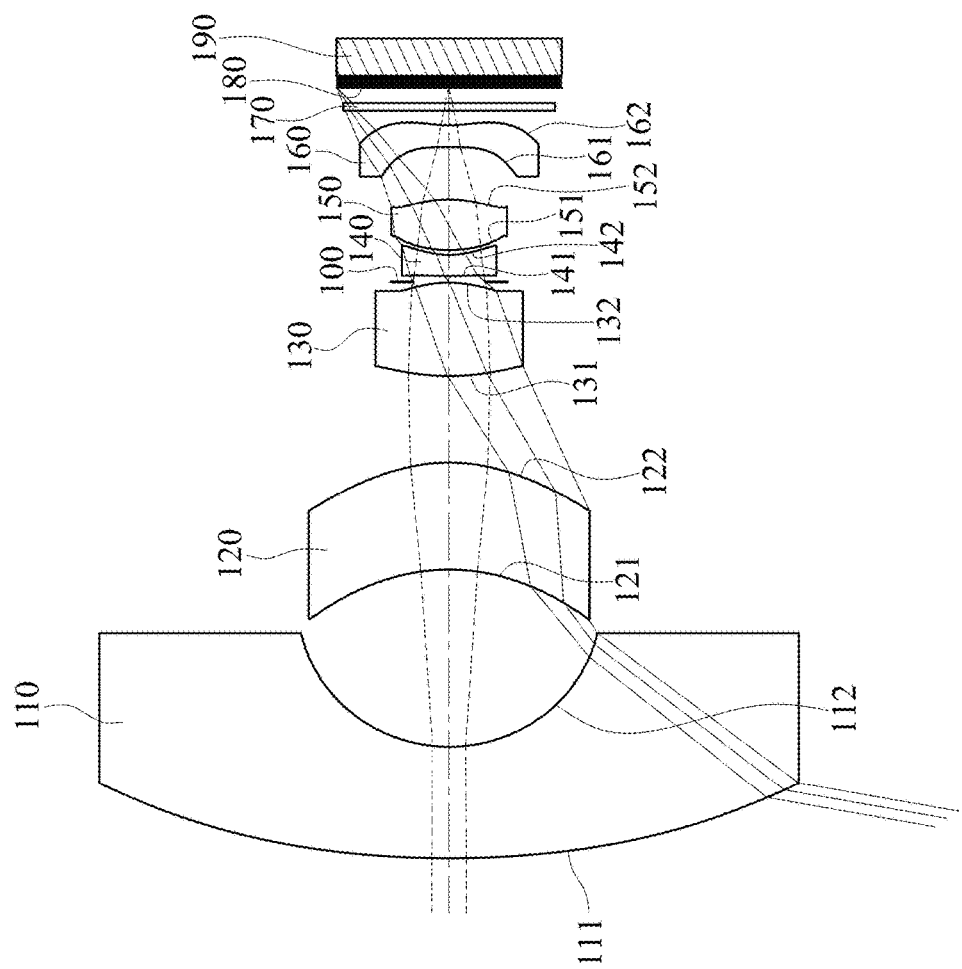
FIG. 1 is a schematic view of an image capturing unit according to the 1st embodiment of the present disclosure.

A photographing lens assembly includes, in order from an object side to an image side, a first lens element, a second lens element, a third lens element, a fourth lens element, a fifth lens element and a sixth lens element.

There can be an air gap in a paraxial region between each of the six adjacent lens elements of the photographing lens assembly; that is, each of the first through the sixth lens elements can be a single and non-cemented lens element. Moreover, the manufacturing process of cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to misalignment and it is thereby not favorable for the image quality. Therefore, there can be an air gap in a paraxial region between each of the six adjacent lens elements in the present disclosure for preventing the problem associated with the cemented lens elements, thereby being favorable for lens molding process and manufacturing yield rate.

The first lens element with negative refractive power has an image-side surface being concave in a paraxial region thereof. Therefore, it is favorable for obtaining a wide angle configuration.

The second lens element can have an image-side surface being convex in a paraxial region thereof. Therefore, the second lens element has an opposite shape as opposed to the first lens element, thereby being favorable for correcting aberrations generated by the first lens element.

The third lens element can have positive refractive power. Therefore, it is favorable for reducing a total track length of the photographing lens assembly so as to maintain a compact size thereof.

The fourth lens element can have negative refractive power. Therefore, it is favorable for correcting aberrations and improving image quality.

The fifth lens element can have positive refractive power. Therefore, it is favorable for reducing the incident angle of the light projecting onto an image sensor so as to improve image-sensing.

The sixth lens element can have negative refractive power; also, the sixth lens element has an image-side surface being concave in a paraxial region thereof, and the image-side surface of the sixth lens element has at least one convex critical point in an off-axis region thereof. Therefore, it is favorable for moving the principal point of the photographing lens assembly away from the image side so as to reduce the total track length for compactness.

According to the disclosure, the first lens element, the second lens element and the third lens element can be assigned as a front lens group of the photographing lens assembly. The fourth lens element, the fifth lens element and the sixth lens element can be assigned as a rear lens group of the photographing lens assembly. When a focal length of the photographing lens assembly is f, a composite focal length of the first lens element, the second lens element and the third lens element is f123, and a composite focal length of the fourth lens element, the fifth lens element and the sixth lens element is f456, the following condition is satisfied: f/f456<0<f/f123. Therefore, the front lens group and the rear lens group have positive refractive power and negative refractive power, respectively, when the first lens element has negative refractive power, so that it is favorable for reducing a back focal length of the photographing lens assembly with a wide angle configuration so as to reduce the total track length, thereby achieving compactness.

When an axial distance between an object-side surface of the first lens element and the image-side surface of the sixth lens element is Td, and an axial distance between the image-side surface of the sixth lens element and an image surface is BL, the following condition is satisfied: 10<Td/BL. Therefore, it is favorable for further reducing the back focal length so as to properly utilize the space in the photographing lens assembly. Preferably, the following condition can be satisfied: 10<Td/BL<100. More preferably, the following condition can also be satisfied: 12.5<Td/BL<30.

When a focal length of the third lens element is f3, and a focal length of the fifth lens element is f5, the following condition is satisfied: 0.60<f3/f5. Therefore, it is favorable for evenly distributing the positive refractive power of the photographing lens assembly so as to prevent overly large refractive power difference between each lens element, thereby obtaining sufficient capability of correcting aberrations. Preferably, the following condition can be satisfied: 0.60<f3/f5<6.0. More preferably, the following condition can also be satisfied: 0.80<f3/f5<3.0.

When the focal length of the photographing lens assembly is f, and the composite focal length of the first lens element, the second lens element and the third lens element is f123, the following condition can be satisfied: 0.50<f/f123<1.50. Therefore, the refractive power of the front lens group is proper for simultaneously satisfying the requirements of a wide view angle and compactness.

When the focal length of the photographing lens assembly is f, and a composite focal length of the first lens element and the second lens element is f12, the following condition can be satisfied: 5.0<f12/f. Therefore, it is favorable for preventing the refractive power of the first lens element from being overly strong so as to properly distribute the refractive power of the front lens group.

When a focal length of the first lens element is f1, and a focal length of the second lens element is f2, the following condition can be satisfied: |f1/f2|<0.90. Therefore, the refractive power of the first lens element is favorable for enlarging field of view for the front lens group.

When the composite focal length of the first lens element, the second lens element and the third lens element is f123, and the composite focal length of the fourth lens element, the fifth lens element and the sixth lens element is f456, the following condition can be satisfied: −0.45<f123/f456<0. Therefore, the refractive power distribution between the front lens group and the rear lens group is favorable for simultaneously satisfying the requirements of a wide view angle and compactness.

When the focal length of the photographing lens assembly is f, and an entrance pupil diameter of the photographing lens assembly is EPD, the following condition can be satisfied: $1.20<f/EPD<2.80$. Therefore, it is favorable for the photographing lens assembly having a large aperture so as to improve image quality in low-light conditions with faster exposures. Preferably, the following condition can also be satisfied: $1.40<f/EPD<2.60$.

When an axial distance between the third lens element and the fourth lens element is T34, an axial distance between the fourth lens element and the fifth lens element is T45, and an axial distance between the fifth lens element and the sixth lens element is T56, the following condition can be satisfied: $1.75<T56/(T34+T45)<10$. Therefore, the axial distance between the fifth lens element and the sixth lens element is sufficient for preventing manufacturing or assembling problems due to an overly short axial distance.

When the focal length of the first lens element is f1, the focal length of the second lens element is f2, the focal length of the third lens element is f3, and the composite focal length of the first lens element, the second lens element and the third lens element is f123, the following condition can be satisfied: $|f123/f1|+|f123/f2|+|f123/f3|<1.0$. Therefore, it is favorable for preventing any of the first through the third lens elements from having overly strong refractive power as to allow incident light from large angle of view projecting onto the image surface. Preferably, the following condition can also be satisfied: $0.5<|f123/f1|+|f123/f2|+|f123/f3|<1.0$.

When a curvature radius of an object-side surface of the second lens element is R3, and a curvature radius of the image-side surface of the second lens element is R4, the following condition can be satisfied: $|(R3-R4)/(R3+R4)|<0.40$. Therefore, the second lens element has an opposite shape to the first lens element so as to be favorable for correcting aberrations generated by the first lens element.

When a central thickness of the second lens element is CT2, and a maximum value among central thicknesses of the six lens elements (the first through the sixth lens elements) of the photographing lens assembly is CTmax, the following condition can be satisfied: $1.0 \leq CTmax/CT2<1.20$. Therefore, the second lens element being relatively more curved will have sufficient structural strength so that it is favorable for increasing manufacturing yield rate.

When a curvature radius of the object-side surface of the first lens element is R1, and a curvature radius of the image-side surface of the first lens element is R2, the following condition can be satisfied: $0.5<(R1+R2)/(R1-R2)<2.0$. Therefore, it is favorable for preventing the relatively larger first lens element from having an overly curved shape so as to allow the incident light from a large angle of view projecting onto the image surface.

When an Abbe number of the fourth lens element is V4, and an Abbe number of the sixth lens element is V6, the following condition can be satisfied: $V4+V6<60$. Therefore, it is favorable for balancing between the corrections of astigmatism and chromatic aberration while reducing an effective radius of the sixth lens element so as to keep the photographing lens assembly compact.

When an axial distance between the object-side surface of the first lens element and an image-side surface of the third lens element is Dr1r6, and an axial distance between an object-side surface of the fourth lens element and the image-side surface of the sixth lens element is Dr7r12, the following condition can be satisfied: $3.0<Dr1r6/Dr7r12<6.0$. Therefore, it is favorable for providing sufficient space for the first through the third lens elements with larger diameters so as to increase the assembling yield rate.

Figure 21:
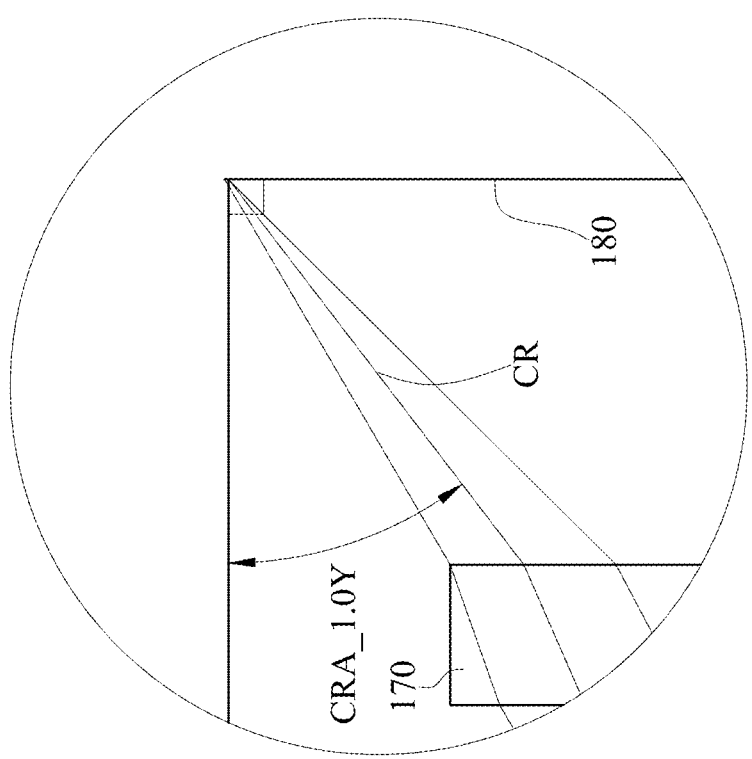
FIG. 21 shows a schematic view of CRA_1.0Y according to the 1st embodiment of the present disclosure.

When half of a maximum field of view of the photographing lens assembly is HFOV, and a chief ray angle at a maximum image height of the photographing lens assembly is CRA_1.0Y, the following condition can be satisfied: $1.75<HFOV/CRA\_1.0Y<3.0$. Therefore, it is favorable for the photographing lens assembly featuring a large field of view and a short back focal length so as to improve photodetection of the image sensor, thereby further improving image quality. FIG. 21 shows a schematic view of CRA_1.0Y according to the 1st embodiment of the present disclosure, wherein a chief ray CR is projected onto a maximum image height on an image surface 180, and an angle between the normal direction of the image surface 180 and the chief ray CR is CRA_1.0Y.

When the maximum field of view of the photographing lens assembly is HFOV, the following condition can be satisfied: $135 [deg.]<FOV<220 [deg.]$. Therefore, it is favorable for the photographing lens assembly being applicable to wide angle cameras in electronic devices.

According to the present disclosure, the lens elements thereof can be made of glass material or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis. Specifically, the critical point is not located on the optical axis.

According to the present disclosure, an image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the optical imaging lens system and the image surface for correcting aberrations such as field curvature. The optical properties of the image correction unit, such as curvature, thickness, index of refraction, position and surface shape (convex or concave surface with spherical, aspheric, diffraction or Fresnel types), can be adjusted according to the design of an image capturing unit. In general, a preferable image correction unit is, for example, a thin transparent element disposed near the image surface having a concave object-side surface and a planar image-side surface.

According to the present disclosure, the photographing lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the photographing lens assembly and thereby provides a wider field of view for the same.

According to the above description of the present disclosure, the following specific embodiments are provided for further explanation.

1st Embodiment

Figure 2:
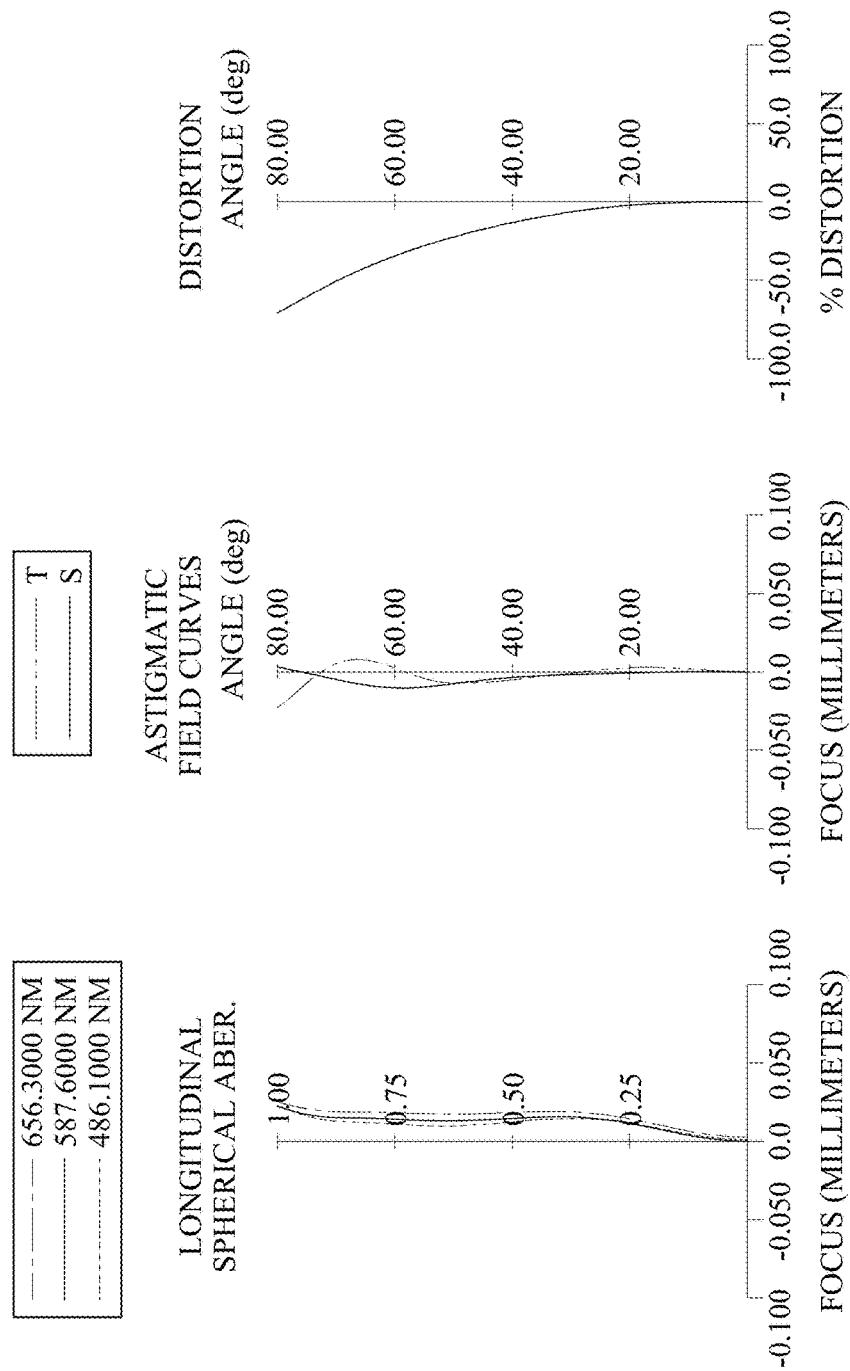
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 190. The photographing lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image surface 180. The photographing lens assembly includes six single and non-cemented lens elements (110, 120, 130, 140, 150 and 160) with no additional lens element disposed between each of the six adjacent lens elements.

The first lens element 110 with negative refractive power has an object-side surface 111 being convex in a paraxial region thereof and an image-side surface 112 being concave in a paraxial region thereof. The first lens element 110 is made of glass material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex critical point in an off-axis region thereof.

The IR-cut filter 170 is made of glass material and located between the sixth lens element 160 and the image surface 180, and will not affect the focal length of the photographing lens assembly. The image sensor 190 is disposed on or near the image surface 180 of the photographing lens assembly.

The equation of the aspheric surface profiles of the aforementioned lens elements of the 1st embodiment is expressed as follows:

$$X(Y)=(Y^2/R)/(1+\text{sqrt}(1+k)\times(Y/R)^2))+\sum_i (Ai)\times(Y_i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=2.15 millimeters (mm), Fno=2.22, HFOV=80.0 degrees (deg.).

When the focal length of the photographing lens assembly is f, and an entrance pupil diameter of the photographing lens assembly is EPD, the following condition is satisfied: f/EPD=2.22.

When a chief ray angle at a maximum image height of the photographing lens assembly is CRA_1.0Y, the following condition is satisfied: CRA_1.0Y=34.4 degrees.

When half of the maximum field of view of the photographing lens assembly is HFOV, and the chief ray angle at the maximum image height of the photographing lens assembly is CRA_1.0Y, the following condition is satisfied: HFOV/CRA_1.0Y=2.33.

When an Abbe number of the fourth lens element 140 is V4, and an Abbe number of the sixth lens element 160 is V6, the following condition is satisfied: V4+V6=43.00.

When a central thickness of the second lens element 120 is CT2, and a maximum value among central thicknesses of the six lens elements of the photographing lens assembly is CTmax, the following condition is satisfied: CTmax/CT2=1.04.

When an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: T56/(T34+T45)=4.54.

When an axial distance between the object-side surface 111 of the first lens element 110 and the image-side surface 132 of the third lens element 130 is Dr1r6, and an axial distance between the object-side surface 141 of the fourth lens element 140 and the image-side surface 162 of the sixth lens element 160 is Dr7r12, the following condition is satisfied: Dr1r6/Dr7r12=3.81.

When an axial distance between the object-side surface 111 of the first lens element 110 and the image-side surface 162 of the sixth lens element 160 is Td, and an axial distance between the image-side surface 162 of the sixth lens element 160 and an image surface 180 is BL, the following condition is satisfied: Td/BL=19.61.

When a curvature radius of the object-side surface 111 of the first lens element 110 is R1, and a curvature radius of the image-side surface 112 of the first lens element 110 is R2, the following condition is satisfied: (R1+R2)/(R1-R2)=1.38.

When a curvature radius of the object-side surface 121 of the second lens element 120 is R3, and a curvature radius of the image-side surface 122 of the second lens element 120 is R4, the following condition is satisfied: |(R3-R4)/(R3+R4)|=0.06.

When a focal length of the first lens element 110 is f1, and a focal length of the second lens element 120 is f2, the following condition is satisfied: |f1/f2|=0.29.

When a focal length of the third lens element 130 is f3, and a focal length of the fifth lens element 150 is f5, the following condition is satisfied: f3/f5=1.15.

When the focal length of the photographing lens assembly is f, and a composite focal length of the first lens element 110 and the second lens element 120 is f12, the following condition is satisfied: f12/f=-11.00.

When the focal length of the photographing lens assembly is f, and a composite focal length of the first lens element 110, the second lens element 120 and the third lens element 130 is f123, the following condition is satisfied: f/f123=1.10.

When the focal length of the photographing lens assembly is f, and a composite focal length of the fourth lens element 140, the fifth lens element 150 and the sixth lens element 160 is f456, the following condition is satisfied: f/f456=-0.26.

When the composite focal length of the first lens element 110, the second lens element 120 and the third lens element 130 is f123, and the composite focal length of the fourth lens element 140, the fifth lens element 150 and the sixth lens element 160 is f456, the following condition is satisfied: f123/f456=-0.24. When the maximum field of view of the photographing lens assembly is FOV, the following condition is satisfied: FOV=160.0 degrees.

When the focal length of the first lens element 110 is f1, the focal length of the second lens element 120 is f2, the focal length of the third lens element 130 is f3, and the composite focal length of the first lens element 110, the second lens element 120 and the third lens element 130 is f123, the following condition is satisfied: |f123/f1|+|f123/f2|+|f123/f3|=0.81.

The detailed optical data of the 1st embodiment are shown in Table 1 and the aspheric surface data are shown in Table 2 below.

TABLE 1

1st Embodiment
f = 2.15 mm, Fno = 2.22, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 27.146 | (ASP) | 3.077 | Glass | 1.755 | 45.6 | -7.20 |
| 2 | | 4.312 | (ASP) | 4.866 | | | | |
| 3 | Lens 2 | -5.576 | (ASP) | 2.955 | Plastic | 1.614 | 26.0 | 25.09 |
| 4 | | -4.919 | (ASP) | 2.378 | | | | |
| 5 | Lens 3 | 6.611 | (ASP) | 2.565 | Plastic | 1.544 | 56.0 | 4.27 |
| 6 | | -3.092 | (ASP) | 0.020 | | | | |
| 7 | Ape. Stop | Plano | | 0.162 | | | | |
| 8 | Lens 4 | 11.662 | (ASP) | 0.577 | Plastic | 1.650 | 21.5 | -4.14 |
| 9 | | 2.146 | (ASP) | 0.135 | | | | |
| 10 | Lens 5 | 3.515 | (ASP) | 1.402 | Plastic | 1.511 | 56.8 | 3.72 |
| 11 | | -3.573 | (ASP) | 1.440 | | | | |
| 12 | Lens 6 | 98.704 | (ASP) | 0.600 | Plastic | 1.650 | 21.5 | -5.31 |
| 13 | | 3.329 | (ASP) | 0.400 | | | | |
| 14 | IR-cut filter | Plano | | 0.210 | Glass | 1.517 | 64.2 | — |
| 15 | | Plano | | 0.419 | | | | |
| 16 | Image | Plano | | — | | | | |

Note:
Reference wavelength is 587.6 nm (d-line).

TABLE 2

Aspheric Coefficients

| Surface # | 1 | 2 | 3 | 4 | 5 | 6 |
|---|---|---|---|---|---|---|
| k = | 1.3533E+00 | 5.6818E-02 | -2.6533E+00 | -4.2326E+00 | -2.0828E+01 | -2.0424E+01 |
| A4 = | 2.2489E-05 | -5.3012E-04 | -1.8611E-03 | -2.1119E-03 | 8.2407E-03 | -4.8469E-02 |
| A6 = | 5.8681E-07 | 4.5734E-05 | 1.9351E-04 | 1.6309E-04 | -2.0872E-03 | 5.3294E-02 |
| A8 = | -9.6776E-09 | -8.3068E-07 | -2.1843E-05 | -1.3040E-05 | 3.3948E-04 | -4.3938E-02 |
| A10 = | 3.9938E-11 | 2.4360E-09 | 1.1488E-06 | 6.2996E-07 | -4.1197E-05 | 2.1678E-02 |
| A12 = | — | — | -2.1732E-08 | -1.1252E-08 | — | -5.8181E-03 |
| A14 = | — | — | — | — | — | 6.5132E-04 |

TABLE 2-continued

| | Aspheric Coefficients | | | | | |
|---|---|---|---|---|---|---|
| Surface # | 8 | 9 | 10 | 11 | 12 | 13 |
| k = | 7.2839E+01 | −2.5080E+00 | 1.5333E+00 | −6.5379E+00 | 9.9000E+01 | −1.1860E+01 |
| A4 = | −4.8965E−02 | −8.4187E−02 | −3.2064E−02 | −1.9314E−02 | −1.1134E−01 | −6.1832E−02 |
| A6 = | 4.1386E−02 | 1.0537E−01 | 5.2568E−02 | 4.9475E−03 | 3.0394E−02 | 1.4254E−02 |
| A8 = | −4.9556E−02 | −8.6177E−02 | −2.4857E−02 | 1.0130E−02 | −1.2282E−02 | −1.9651E−03 |
| A10 = | 2.8961E−02 | 4.2417E−02 | 9.9452E−04 | −1.1543E−02 | 6.4110E−03 | 1.3821E−05 |
| A12 = | −8.1163E−03 | −1.3818E−02 | 2.8544E−03 | 6.4454E−03 | −2.7492E−03 | 2.4220E−05 |
| A14 = | — | 2.1471E−03 | −8.7852E−04 | −1.4028E−03 | 5.7974E−04 | −2.8485E−06 |
| A16 = | — | — | 7.2810E−05 | 8.5653E−05 | −4.2797E−05 | 1.4957E−07 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
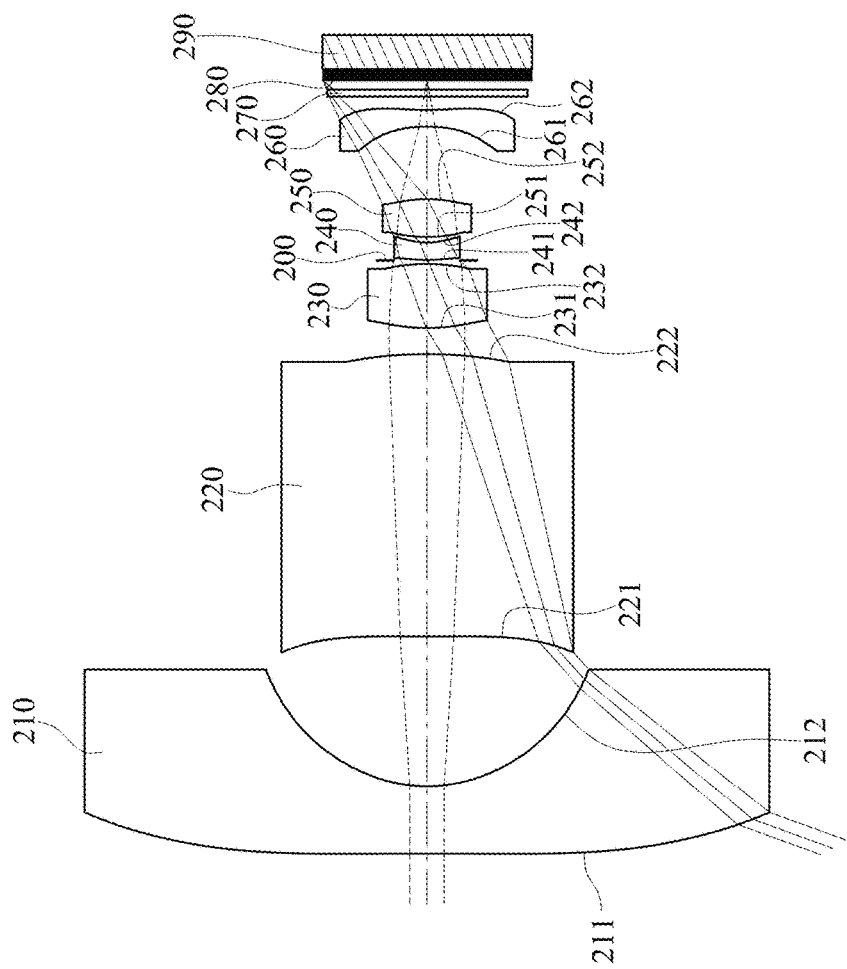
FIG. 3 is a schematic view of an image capturing unit according to the 2nd embodiment of the present disclosure.
Figure 4:
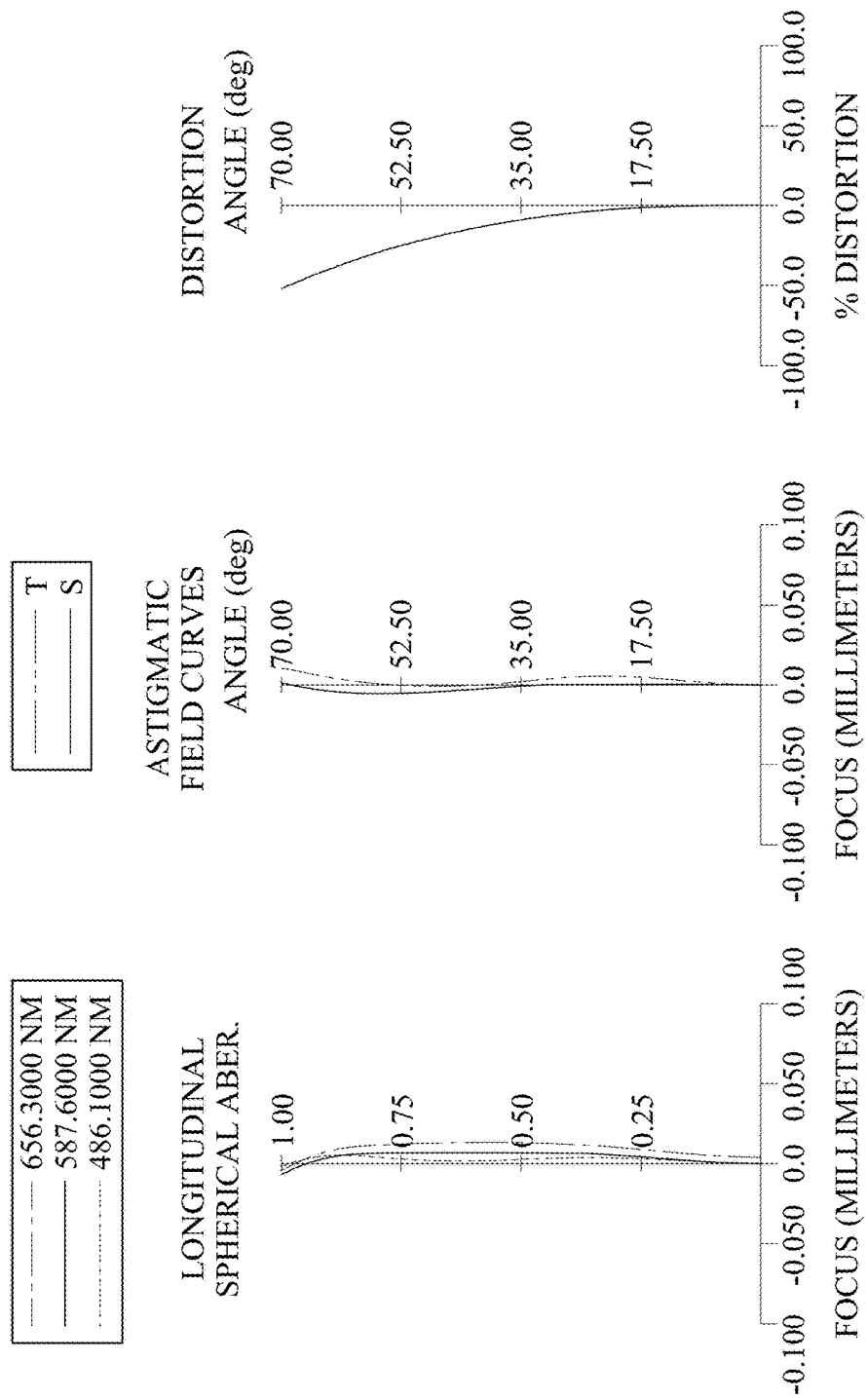
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 290. The photographing lens assembly includes, in order from an object side to an image side, a first lens element 210, a second lens element 220, a third lens element 230, an aperture stop 200, a fourth lens element 240, a fifth lens element 250, a sixth lens element 260, an IR-cut filter 270 and an image surface 280. The photographing lens assembly includes six single and non-cemented lens elements (210, 220, 230, 240, 250 and 260) with no additional lens element disposed between each of the six adjacent lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex critical point in an off-axis region thereof.

The IR-cut filter 270 is made of glass material and located between the sixth lens element 260 and the image surface 280, and will not affect the focal length of the photographing lens assembly. The image sensor 290 is disposed on or near the image surface 280 of the photographing lens assembly.

The detailed optical data of the 2nd embodiment are shown in Table 3 and the aspheric surface data are shown in Table 4 below.

TABLE 3

2nd Embodiment
f = 2.52 mm, Fno = 2.45, HFOV = 70.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −194.880 (ASP) | 2.034 | Plastic | 1.545 | 56.1 | −8.10 |
| 2 | | 4.535 (ASP) | 4.487 | | | | |
| 3 | Lens 2 | 95.607 (ASP) | 8.476 | Plastic | 1.584 | 28.2 | 21.65 |
| 4 | | −14.100 (ASP) | 0.783 | | | | |

TABLE 3-continued

2nd Embodiment
f = 2.52 mm, Fno = 2.45, HFOV = 70.0 deg.

| Surface # |  | Curvature Radius |  | Thickness | Material | Index | Abbe # | Focal Length |
|---|---|---|---|---|---|---|---|---|
| 5 | Lens 3 | 5.536 | (ASP) | 1.918 | Plastic | 1.544 | 56.0 | 5.14 |
| 6 |  | −4.970 | (ASP) | 0.103 |  |  |  |  |
| 7 | Ape. Stop | Plano |  | 0.020 |  |  |  |  |
| 8 | Lens 4 | 5.323 | (ASP) | 0.518 | Plastic | 1.669 | 19.5 | −5.21 |
| 9 |  | 2.024 | (ASP) | 0.168 |  |  |  |  |
| 10 | Lens 5 | 4.457 | (ASP) | 1.152 | Plastic | 1.515 | 56.5 | 4.25 |
| 11 |  | −3.918 | (ASP) | 2.169 |  |  |  |  |
| 12 | Lens 6 | −5.307 | (ASP) | 0.500 | Plastic | 1.559 | 40.4 | −5.42 |
| 13 |  | 7.288 | (ASP) | 0.400 |  |  |  |  |
| 14 | IR-cut filter | Plano |  | 0.210 | Glass | 1.517 | 64.2 | — |
| 15 |  | Plano |  | 0.281 |  |  |  |  |
| 16 | Image | Plano |  | — |  |  |  |  |

Note:
Reference wavelength is 587.6 nm (d-line).
An effective radius of the image-side surface 262 (Surface 13) is 2.620 mm.

TABLE 4

Aspheric Coefficients

| Surface # | 1 | 2 | 3 | 4 | 5 | 6 |
|---|---|---|---|---|---|---|
| k = | 1.8064E+01 | −4.1276E−01 | 9.6042E+01 | −3.8877E+00 | −1.9417E+01 | −1.9864E+01 |
| A4 = | 2.0784E−04 | −7.1941E−04 | −1.9940E−03 | −2.1748E−03 | 1.0044E−02 | 9.0805E−03 |
| A6 = | −7.5806E−07 | 4.9096E−05 | 3.6526E−05 | 5.1077E−04 | −3.5063E−03 | −1.1585E−02 |
| A8 = | −1.0914E−09 | −1.6885E−06 | −1.7570E−06 | −6.0015E−05 | 7.9047E−04 | −2.2294E−03 |
| A10 = | 1.7267E−11 | 6.8456E−08 | 5.8412E−08 | 2.5902E−06 | −1.8205E−04 | 2.2422E−03 |
| A12 = | — | — | −4.2527E−10 | 7.0353E−09 | — | −3.3813E−04 |
| A14 = | — | — | — | — | — | −7.8272E−06 |

| Surface # | 8 | 9 | 10 | 11 | 12 | 13 |
|---|---|---|---|---|---|---|
| k = | 1.3044E+01 | −2.8383E+00 | 2.9652E+00 | −1.0587E+01 | 3.2887E+00 | −1.0824E+01 |
| A4 = | −4.9119E−02 | −6.2562E−02 | −1.9916E−02 | −1.4898E−02 | −4.7163E−02 | −3.8404E−02 |
| A6 = | 1.8217E−02 | 6.6494E−02 | 2.6946E−02 | 9.7278E−03 | 2.5386E−02 | 1.4447E−02 |
| A8 = | −3.9926E−02 | −6.3068E−02 | 5.2778E−03 | −4.4032E−04 | −1.0651E−02 | −4.3961E−03 |
| A10 = | 2.0728E−02 | 2.5444E−02 | −2.8732E−02 | 2.7990E−03 | 3.1900E−03 | 8.6908E−04 |
| A12 = | −4.3950E−03 | −3.3988E−03 | 2.1958E−02 | −2.3766E−03 | −6.0364E−04 | −1.0736E−04 |
| A14 = | — | −1.5553E−04 | −6.8355E−03 | 1.2410E−03 | 6.2912E−05 | 7.2823E−06 |
| A16 = | — | — | 7.6596E−04 | −2.1975E−04 | −2.6045E−06 | −2.0836E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment ||||
|---|---|---|---|
| f [mm] | 2.52 | (R1 + R2)/(R1 − R2) | 0.95 |
| Fno | 2.45 | \|(R3 − R4)/(R3 + R4)\| | 1.35 |
| f/EPD | 2.45 | \|f1/f2\| | 0.37 |
| HFOV [deg.] | 70.0 | f3/f5 | 1.21 |
| CRA_1.0Y [deg.] | 35.0 | f12/f | −16.48 |
| HFOV/CRA_1.0Y | 2.00 | f/f123 | 1.02 |
| V4 + V6 | 59.90 | f/f456 | −0.27 |
| CTmax/CT2 | 1.00 | f123/f456 | −0.27 |
| T56/(T34 + T45) | 7.45 | FOV [deg.] | 140.0 |
| Dr1r6/Dr7r12 | 3.93 | \|f123/f1\| + \|f123/f2\| + \|f123/f3\| | 0.90 |
| Td/BL | 25.05 | — | — |

3rd Embodiment

Figure 5:
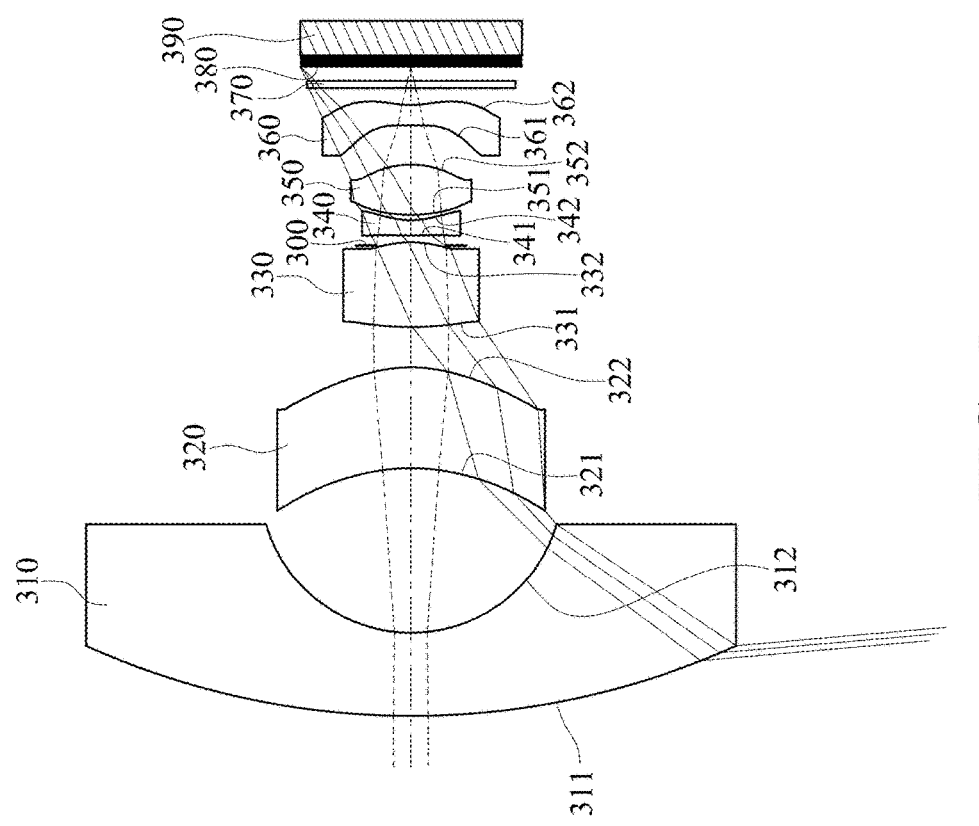
FIG. 5 is a schematic view of an image capturing unit according to the 3rd embodiment of the present disclosure.
Figure 6:
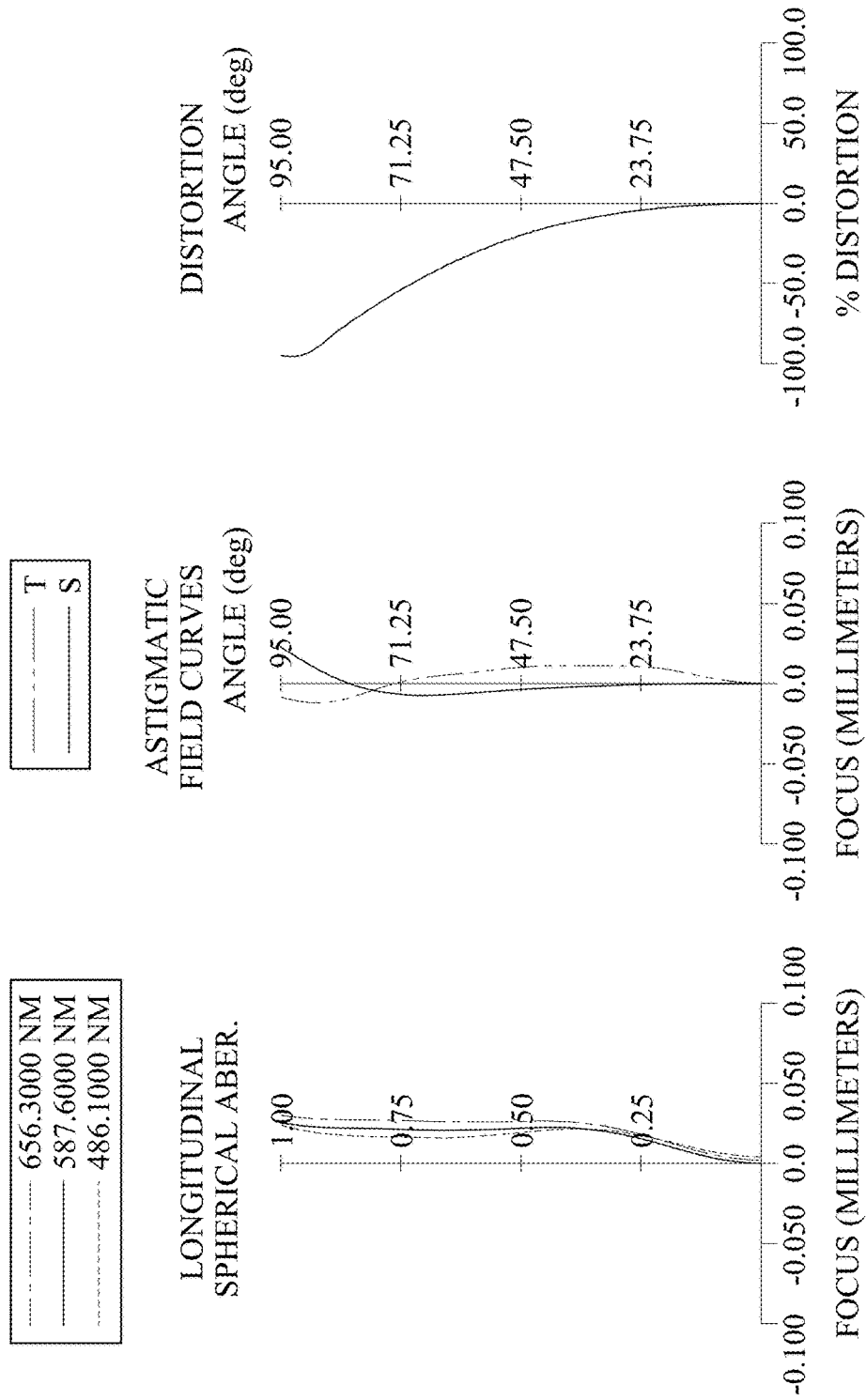
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 390. The photographing lens assembly includes, in order from an object side to an image side, a first lens element 310, a second lens element 320, a third lens element 330, an aperture stop 300, a fourth lens element 340, a fifth lens element 350, a sixth lens element 360, an IR-cut filter 370 and an image surface 380. The photographing lens assembly includes six single and non-cemented lens elements (310, 320, 330, 340, 350 and 360) with no additional lens element disposed between each of the six adjacent lens elements.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both spherical.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex critical point in an off-axis region thereof.

The IR-cut filter 370 is made of glass material and located between the sixth lens element 360 and the image surface 380, and will not affect the focal length of the photographing lens assembly. The image sensor 390 is disposed on or near the image surface 380 of the photographing lens assembly.

The detailed optical data of the 3rd embodiment are shown in Table 5 and the aspheric surface data are shown in Table 6 below.

TABLE 5

3rd Embodiment
f = 2.08 mm, Fno = 2.05, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.284 | | 2.450 | Glass | 1.804 | 46.6 | −7.29 |
| 2 | | 4.463 | | 4.873 | | | | |
| 3 | Lens 2 | −5.906 | (ASP) | 2.976 | Plastic | 1.614 | 26.0 | 14.21 |
| 4 | | −4.196 | (ASP) | 1.187 | | | | |
| 5 | Lens 3 | 10.282 | (ASP) | 2.519 | Plastic | 1.544 | 56.0 | 4.35 |
| 6 | | −2.810 | (ASP) | −0.098 | | | | |
| 7 | Ape. Stop | Plano | | 0.296 | | | | |
| 8 | Lens 4 | 18.607 | (ASP) | 0.450 | Plastic | 1.661 | 20.3 | −3.85 |
| 9 | | 2.214 | (ASP) | 0.157 | | | | |
| 10 | Lens 5 | 3.777 | (ASP) | 1.481 | Plastic | 1.544 | 56.0 | 3.18 |
| 11 | | −2.746 | (ASP) | 1.159 | | | | |
| 12 | Lens 6 | 33.588 | (ASP) | 0.600 | Plastic | 1.642 | 22.5 | −4.52 |
| 13 | | 2.653 | (ASP) | 0.500 | | | | |
| 14 | IR-cut filter | Plano | | 0.210 | Glass | 1.517 | 64.2 | — |
| 15 | | Plano | | 0.418 | | | | |
| 16 | Image | Plano | | — | | | | |

Note:
Reference wavelength is 587.6 nm (d-line).

TABLE 6

Aspheric Coefficients

| Surface # | 3 | 4 | 5 | 6 | 8 |
|---|---|---|---|---|---|
| k = | −4.8709E+00 | −6.5747E+00 | −2.0868E+01 | −2.0448E+01 | 7.3377E+01 |
| A4 = | −4.0867E−04 | −1.5888E−03 | 8.4982E−03 | −3.4281E−02 | −1.5568E−03 |
| A6 = | −1.1601E−04 | −1.8703E−05 | −3.4039E−03 | 2.5412E−02 | −2.5511E−02 |
| A8 = | 5.3190E−06 | 6.2157E−06 | 5.6649E−04 | −1.9514E−02 | 1.4269E−02 |
| A10 = | −1.6547E−08 | −3.1090E−07 | −6.6654E−05 | 8.4644E−03 | −6.9753E−03 |
| A12 = | −1.2795E−09 | 6.6786E−09 | — | −1.6439E−03 | 1.2864E−03 |
| A14 = | — | — | — | 7.7638E−05 | — |

| Surface # | 9 | 10 | 11 | 12 | 13 |
|---|---|---|---|---|---|
| k = | −2.7815E+00 | 1.5160E+00 | −6.6551E+00 | 9.9000E+01 | −1.1468E+01 |
| A4 = | −7.3535E−02 | −5.0187E−02 | −5.0873E−02 | −1.3800E−01 | −6.3132E−02 |
| A6 = | 6.9780E−02 | 4.4649E−02 | 1.9916E−02 | 4.4830E−02 | 1.9403E−02 |
| A8 = | −4.9217E−02 | −2.7201E−02 | −1.1409E−02 | −1.9250E−02 | −5.2909E−03 |
| A10 = | 2.1134E−02 | 1.4724E−02 | 8.8402E−03 | 8.4934E−03 | 1.0358E−03 |
| A12 = | −5.5859E−03 | −5.9481E−03 | −4.5391E−03 | −2.5098E−03 | −1.3195E−04 |
| A14 = | 6.4760E−04 | 1.3935E−03 | 1.3704E−03 | 4.1074E−04 | 9.5945E−06 |
| A16 = | — | −1.3724E−04 | −1.6007E−04 | −2.7093E−05 | −2.8593E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.08 | (R1 + R2)/(R1 − R2) | 1.47 |
| Fno | 2.05 | |(R3 − R4)/(R3 + R4)| | 0.17 |
| f/EPD | 2.05 | |f1/f2| | 0.51 |
| HFOV [deg.] | 95.0 | f3/f5 | 1.37 |
| CRA_1.0Y [deg.] | 35.4 | f12/f | 34.48 |
| HFOV/CRA_1.0Y | 2.68 | f/f123 | 1.06 |
| V4 + V6 | 42.80 | f/f456 | −0.20 |
| CTmax/CT2 | 1.00 | f123/f456 | −0.19 |
| T56/(T34 + T45) | 3.26 | FOV [deg.] | 190.0 |
| Dr1r6/Dr7r12 | 3.64 | |f123/f1| + |f123/f2| + |f123/f3| | 0.86 |
| Td/BL | 16.00 | — | |

4th Embodiment

Figure 7:
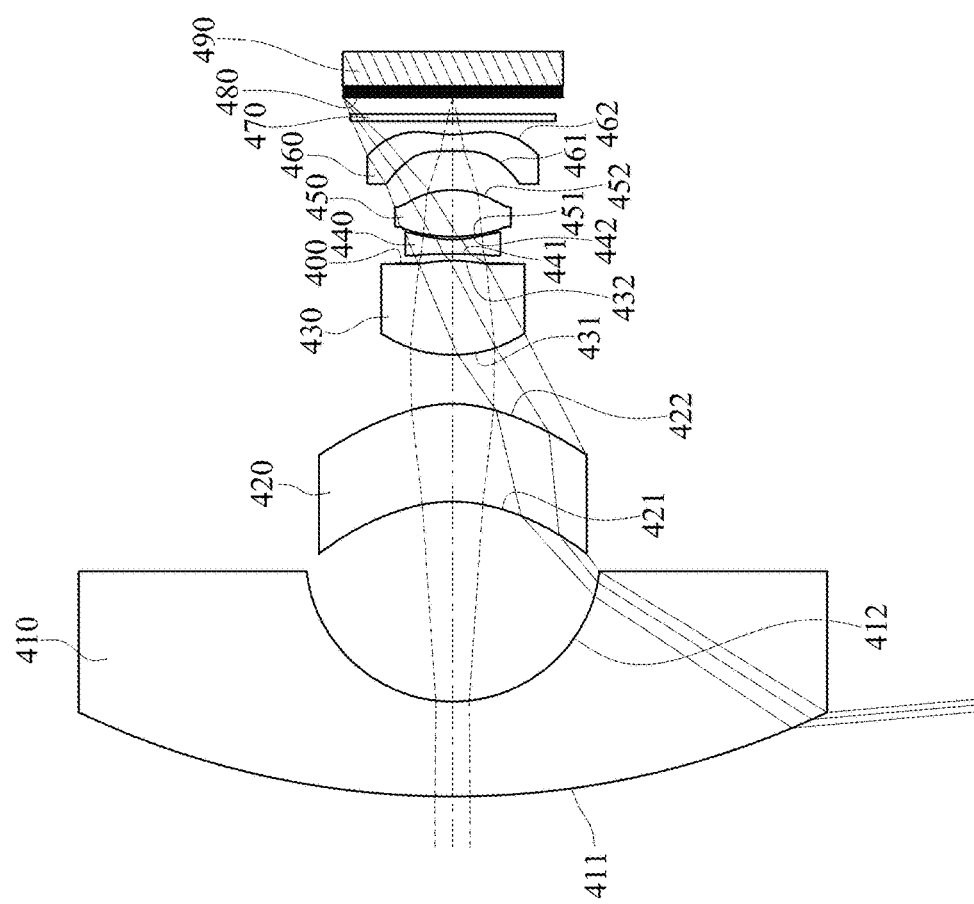
FIG. 7 is a schematic view of an image capturing unit according to the 4th embodiment of the present disclosure.
Figure 8:
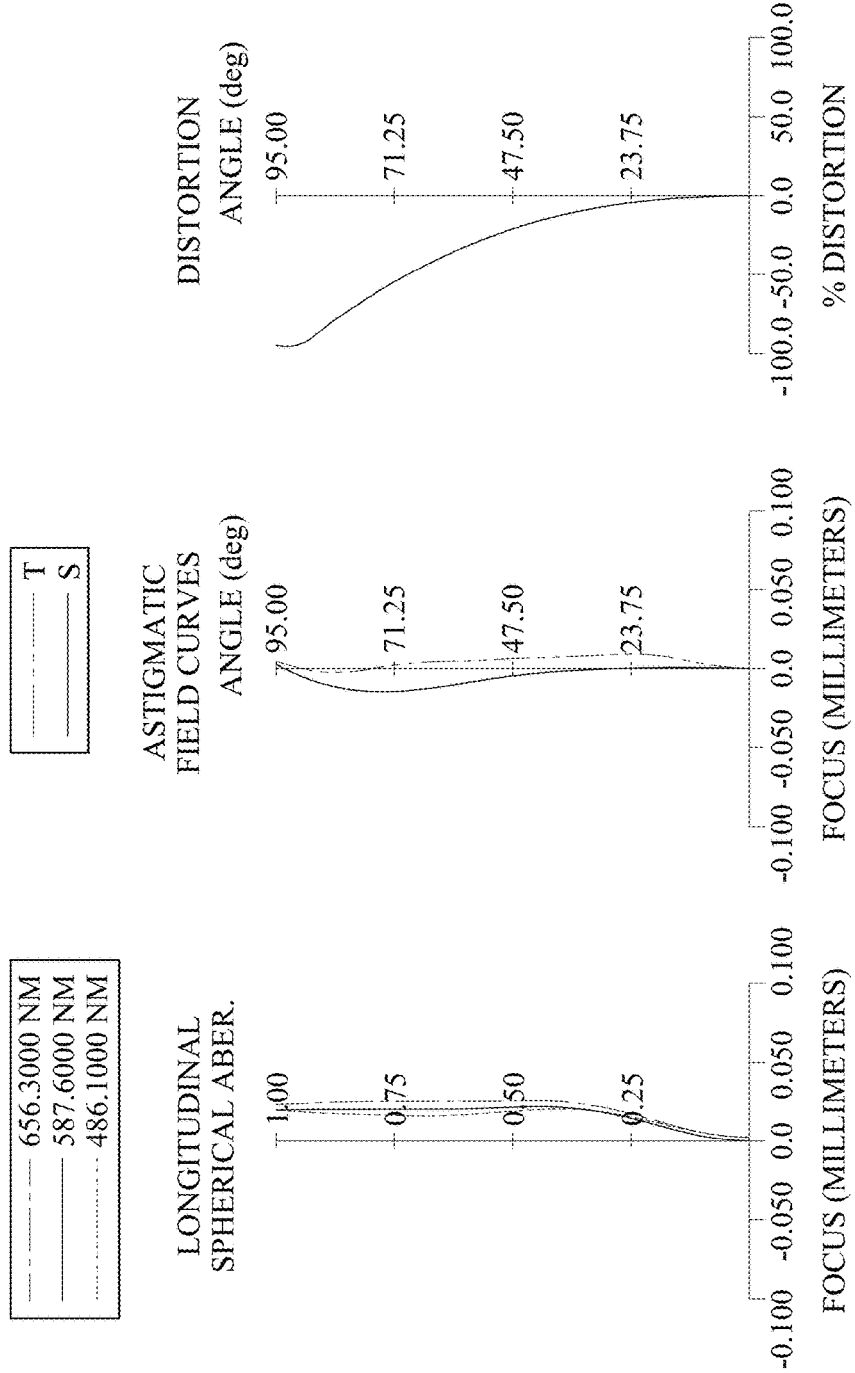
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 490. The photographing lens assembly includes, in order from an object side to an image side, a first lens element 410, a second lens element 420, a third lens element 430, an aperture stop 400, a fourth lens element 440, a fifth lens element 450, a sixth lens element 460, an IR-cut filter 470 and an image surface 480. The photographing lens assembly includes six single and non-cemented lens elements (410, 420, 430, 440, 450 and 460) with no additional lens element disposed between each of the six adjacent lens elements.

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both spherical.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex critical point in an off-axis region thereof.

The IR-cut filter 470 is made of glass material and located between the sixth lens element 460 and the image surface 480, and will not affect the focal length of the photographing lens assembly. The image sensor 490 is disposed on or near the image surface 480 of the photographing lens assembly.

The detailed optical data of the 4th embodiment are shown in Table 7 and the aspheric surface data are shown in Table 8 below.

TABLE 7

4th Embodiment
f = 2.11 mm, Fno = 2.03, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 26.021 | | 2.815 | Glass | 1.729 | 54.7 | −7.64 |
| 2 | | 4.381 | | 5.964 | | | | |
| 3 | Lens 2 | −4.474 | (ASP) | 2.904 | Plastic | 1.566 | 37.4 | 17.52 |
| 4 | | −3.806 | (ASP) | 1.456 | | | | |
| 5 | Lens 3 | 4.359 | (ASP) | 2.815 | Plastic | 1.511 | 56.8 | 4.55 |
| 6 | | −3.888 | (ASP) | −0.089 | | | | |
| 7 | Ape. Stop | Plano | | 0.285 | | | | |
| 8 | Lens 4 | −34.563 | (ASP) | 0.430 | Plastic | 1.661 | 20.3 | −3.89 |
| 9 | | 2.786 | (ASP) | 0.085 | | | | |
| 10 | Lens 5 | 3.925 | (ASP) | 1.386 | Plastic | 1.511 | 56.8 | 3.35 |
| 11 | | −2.668 | (ASP) | 1.154 | | | | |
| 12 | Lens 6 | 26.621 | (ASP) | 0.491 | Plastic | 1.614 | 26.0 | −4.86 |
| 13 | | 2.664 | (ASP) | 0.400 | | | | |
| 14 | IR-cut filter | Plano | | 0.210 | Glass | 1.517 | 64.2 | — |

TABLE 7-continued

4th Embodiment
f = 2.11 mm, Fno = 2.03, HFOV = 95.0 deg.

| Surface # | | Curvature Radius | Thickness | Material | Index | Abbe # | Focal Length |
|---|---|---|---|---|---|---|---|
| 15 | | Plano | 0.498 | | | | |
| 16 | Image | Plano | — | | | | |

Note:
Reference wavelength is 587.6 nm (d-line).

TABLE 8

Aspheric Coefficients

| Surface # | 3 | 4 | 5 | 6 | 8 |
|---|---|---|---|---|---|
| k = | −4.4583E+00 | −5.0619E+00 | −7.9945E−01 | −4.3488E+01 | 9.8683E+00 |
| A4 = | −1.5388E−03 | −1.4551E−03 | 9.6207E−03 | −1.8360E−02 | 1.5303E−02 |
| A6 = | 2.2886E−05 | −4.0641E−06 | −1.5569E−03 | 1.8602E−02 | −4.2030E−02 |
| A8 = | −3.6680E−06 | 3.1475E−06 | 1.1199E−04 | −1.8294E−02 | 1.8445E−02 |
| A10 = | 2.4732E−07 | −1.4714E−07 | 2.9978E−05 | 8.6517E−03 | −4.3918E−03 |
| A12 = | −4.1331E−09 | 3.4420E−09 | −6.2244E−06 | −1.5595E−03 | — |

| Surface # | 9 | 10 | 11 | 12 | 13 |
|---|---|---|---|---|---|
| k = | −1.8592E+00 | 2.8872E+00 | −3.2699E+00 | 9.9000E+01 | −1.1065E+01 |
| A4 = | −5.6959E−02 | −5.8571E−02 | −3.4425E−02 | −1.6430E−01 | −9.2171E−02 |
| A6 = | 4.3501E−02 | 4.9905E−02 | 5.3039E−03 | 5.2239E−02 | 3.4832E−02 |
| A8 = | −2.7523E−02 | −2.3928E−02 | 3.4213E−03 | −1.3830E−02 | −1.0900E−02 |
| A10 = | 8.6529E−03 | 5.1285E−03 | −3.3502E−03 | 2.9545E−03 | 2.3816E−03 |
| A12 = | −1.1886E−03 | −1.3415E−04 | 1.4499E−03 | −4.2198E−04 | −3.3525E−04 |
| A14 = | — | −8.0462E−05 | −1.8268E−04 | 2.2556E−05 | 2.6773E−05 |
| A16 = | — | — | — | 1.3750E−06 | −9.0855E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.11 | (R1 + R2)/(R1 − R2) | 1.40 |
| Fno | 2.03 | |(R3 − R4)/(R3 + R4)| | 0.08 |
| f/EPD | 2.03 | |f1/f2| | 0.44 |
| HFOV [deg.] | 95.0 | f3/f5 | 1.36 |
| CRA_1.0Y [deg.] | 35.7 | f12/f | 110.53 |
| HFOV/CRA_1.0Y | 2.66 | f/f123 | 1.11 |
| V4 + V6 | 46.30 | f/f456 | −0.23 |
| CTmax/CT2 | 1.00 | f123/f456 | −0.21 |
| T56/(T34 + T45) | 4.11 | FOV [deg.] | 190.0 |
| Dr1r6/Dr7r12 | 4.50 | |f123/f1| + |f123/f2| + |f123/f3| | 0.78 |
| Td/BL | 17.77 | — | |

5th Embodiment

Figure 9:
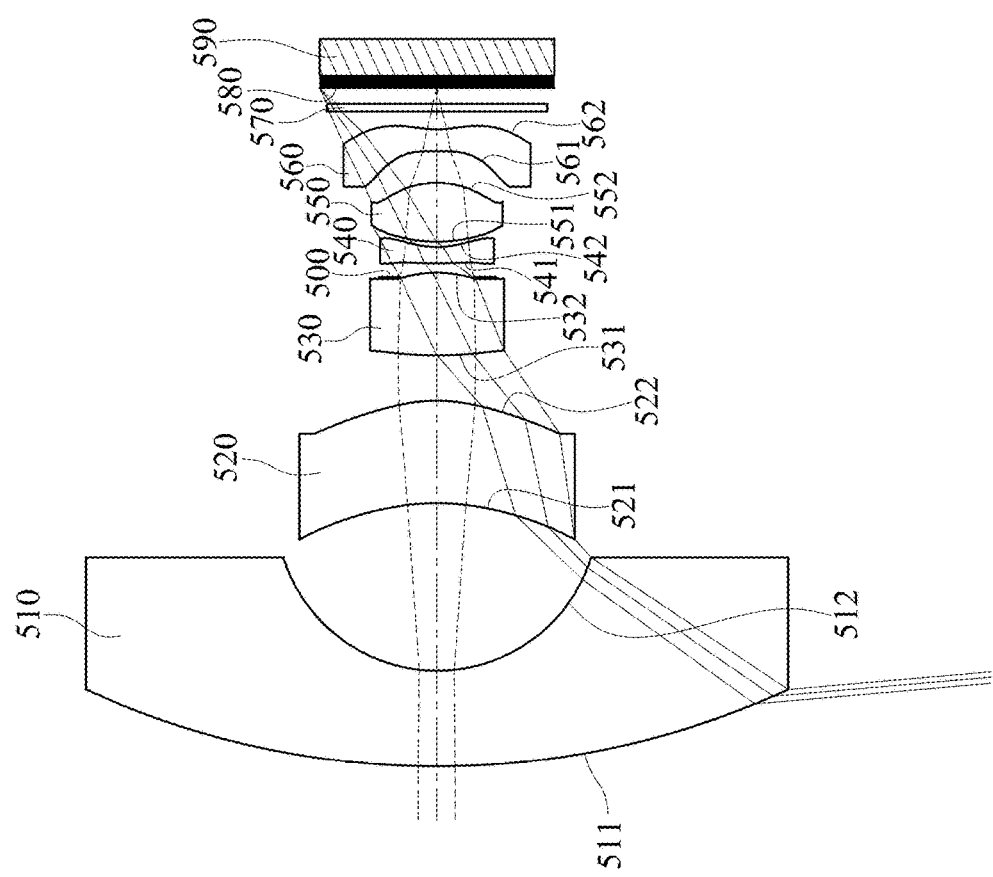
FIG. 9 is a schematic view of an image capturing unit according to the 5th embodiment of the present disclosure.
Figure 10:
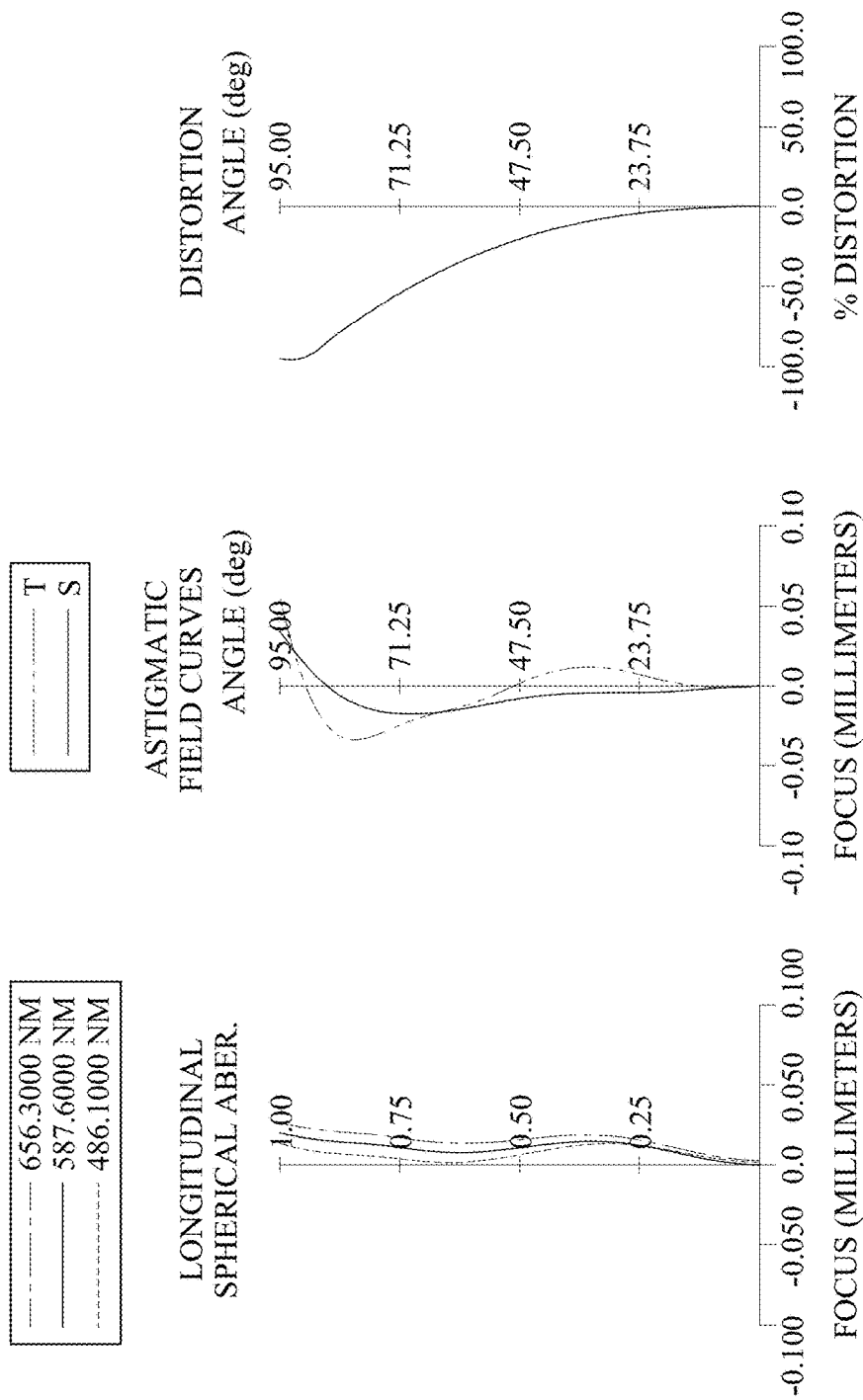
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 590. The photographing lens assembly includes, in order from an object side to an image side, a first lens element 510, a second lens element 520, a third lens element 530, an aperture stop 500, a fourth lens element 540, a fifth lens element 550, a sixth lens element 560, an IR-cut filter 570 and an image surface 580. The photographing lens assembly includes six single and non-cemented lens elements (510, 520, 530, 540, 550 and 560) with no additional lens element disposed between each of the six adjacent lens elements.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex critical point in an off-axis region thereof.

The IR-cut filter 570 is made of glass material and located between the sixth lens element 560 and the image surface 580, and will not affect the focal length of the photographing lens assembly. The image sensor 590 is disposed on or near the image surface 580 of the photographing lens assembly.

The detailed optical data of the 5th embodiment are shown in Table 9 and the aspheric surface data are shown in Table 10 below.

TABLE 9

5th Embodiment
f = 2.10 mm, Fno = 2.05, HFOV = 95.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.287 | | 2.664 | Glass | 1.804 | 46.6 | −7.38 |
| 2 | | 4.486 | | 4.666 | | | | |
| 3 | Lens 2 | −6.290 | (ASP) | 2.865 | Plastic | 1.614 | 26.0 | 13.81 |
| 4 | | −4.236 | (ASP) | 1.260 | | | | |
| 5 | Lens 3 | 13.322 | (ASP) | 2.299 | Plastic | 1.544 | 56.0 | 4.43 |
| 6 | | −2.763 | (ASP) | −0.136 | | | | |
| 7 | Ape. Stop | Plano | | 0.395 | | | | |
| 8 | Lens 4 | 12.838 | (ASP) | 0.450 | Plastic | 1.661 | 20.3 | −4.10 |
| 9 | | 2.206 | (ASP) | 0.146 | | | | |
| 10 | Lens 5 | 3.447 | (ASP) | 1.644 | Plastic | 1.544 | 56.0 | 2.96 |
| 11 | | −2.507 | (ASP) | 0.891 | | | | |
| 12 | Lens 6 | −66.398 | (ASP) | 0.608 | Plastic | 1.642 | 22.5 | −3.70 |
| 13 | | 2.473 | (ASP) | 0.500 | | | | |
| 14 | IR-cut filter | Plano | | 0.210 | Glass | 1.517 | 64.2 | — |
| 15 | | Plano | | 0.447 | | | | |
| 16 | Image | Plano | | — | | | | |

Note:
Reference wavelength is 587.6 nm (d-line).

TABLE 10

Aspheric Coefficients

| Surface # | 3 | 4 | 5 | 6 | 8 |
|---|---|---|---|---|---|
| k = | −8.3343E+00 | −7.2168E+00 | −8.6422E+00 | −1.9731E+01 | 4.9843E+01 |
| A4 = | −7.8971E−04 | 9.8146E−05 | 1.1312E−02 | −3.6872E−02 | 7.0407E−03 |
| A6 = | −8.8188E−07 | −1.6008E−04 | −5.7397E−03 | 2.6618E−02 | −4.4012E−02 |
| A8 = | −4.8733E−06 | 1.4945E−05 | 1.4510E−03 | −1.9495E−02 | 1.9285E−02 |
| A10 = | 3.6395E−07 | −7.2500E−07 | −2.6676E−04 | 8.1813E−03 | 8.5727E−04 |
| A12 = | −6.2734E−09 | 1.8993E−08 | 1.6731E−05 | −1.5434E−03 | −3.4111E−03 |
| A14 = | — | — | — | 7.2421E−05 | — |

| Surface # | 9 | 10 | 11 | 12 | 13 |
|---|---|---|---|---|---|
| k = | −2.9116E+00 | 1.3818E+00 | −4.7441E+00 | −9.9000E+01 | −1.2321E+01 |
| A4 = | −5.5800E−02 | −4.8967E−02 | −5.3139E−02 | −1.7123E−01 | −7.7343E−02 |
| A6 = | 3.3265E−02 | 3.9019E−02 | 2.8840E−02 | 6.2050E−02 | 2.9154E−02 |
| A8 = | −2.9886E−02 | −3.8565E−02 | −2.5792E−02 | −2.0536E−02 | −8.6770E−03 |
| A10 = | 2.0911E−02 | 2.7420E−02 | 1.9840E−02 | 6.0710E−03 | 1.7516E−03 |
| A12 = | −7.9973E−03 | −1.0651E−02 | −9.2519E−03 | −1.5556E−03 | −2.2666E−04 |
| A14 = | 1.0954E−03 | 2.0642E−03 | 2.3107E−03 | 2.8104E−04 | 1.7037E−05 |
| A16 = | — | −1.5763E−04 | −2.2171E−04 | −2.1169E−05 | −5.5522E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.10 | (R1 + R2)/(R1 − R2) | 1.48 |
| Fno | 2.05 | |(R3 − R4)/(R3 + R4)| | 0.20 |
| f/EPD | 2.05 | |f1/f2| | 0.53 |
| HFOV [deg.] | 95.0 | f3/f5 | 1.50 |
| CRA_1.0Y [deg.] | 35.5 | f12/f | 34.43 |
| HFOV/CRA_1.0Y | 2.68 | f/f123 | 1.01 |
| V4 + V6 | 42.80 | f/f456 | −0.19 |
| CTmax/CT2 | 1.00 | f123/f456 | −0.18 |
| T56/(T34 + T45) | 2.20 | FOV [deg.] | 190.0 |
| Dr1r6/Dr7r12 | 3.68 | |f123/f1| + |f123/f2| + |f123/f3| | 0.91 |
| Td/BL | 15.35 | — | — |

6th Embodiment

Figure 11:
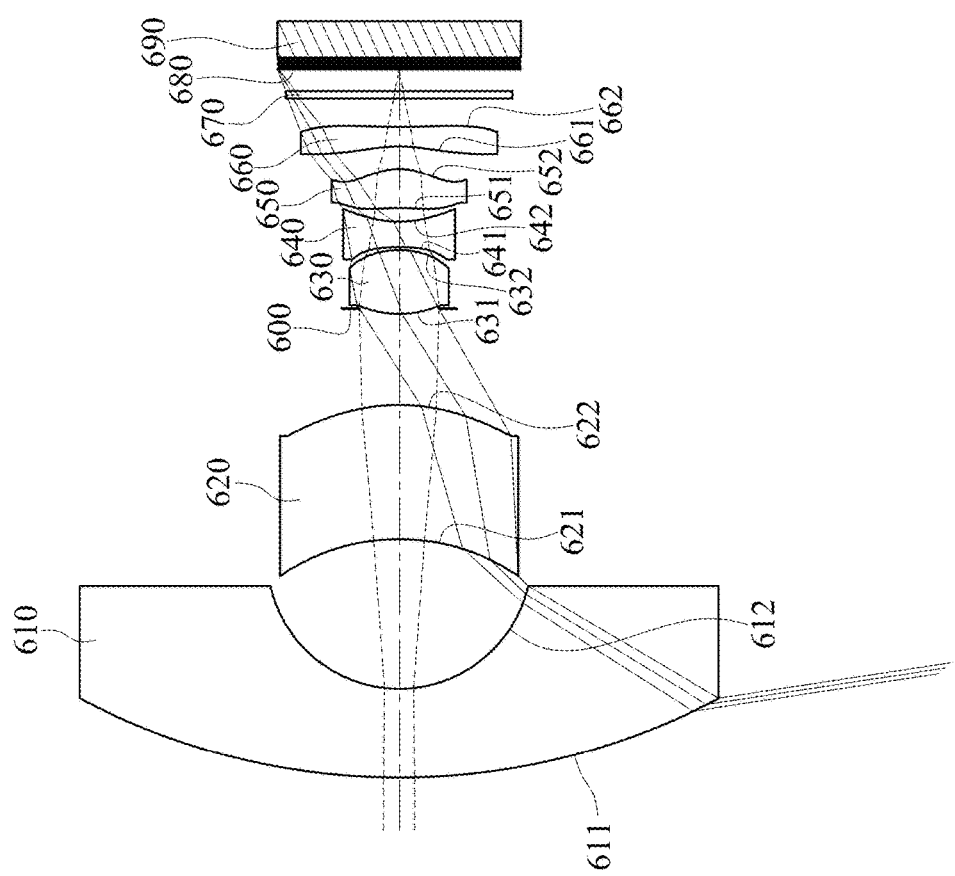
FIG. 11 is a schematic view of an image capturing unit according to the 6th embodiment of the present disclosure.
Figure 12:
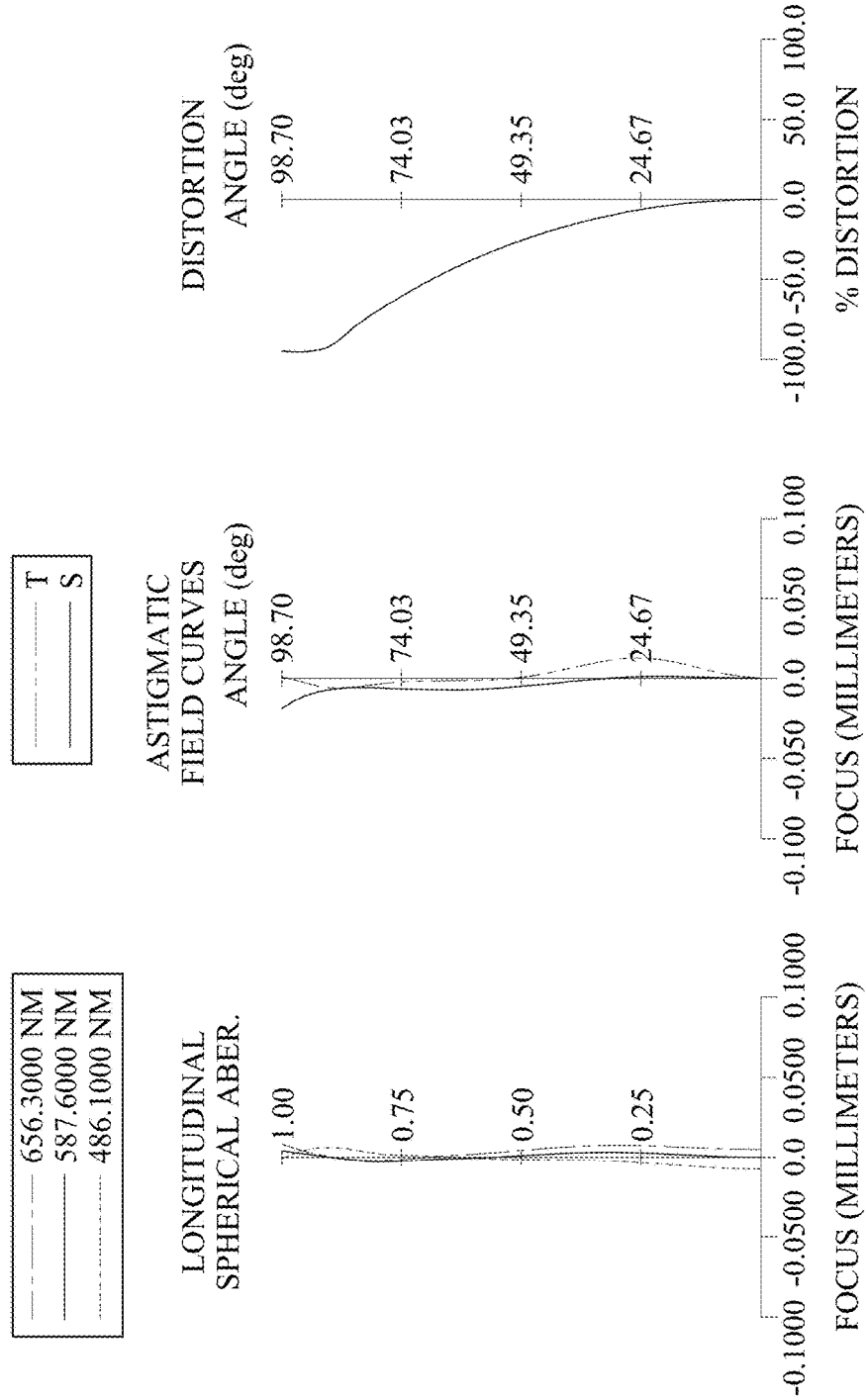
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 690. The photographing lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680. The photographing lens assembly includes six single and non-cemented lens elements (610, 620, 630, 640, 650 and 660) with no additional lens element disposed between each of the six adjacent lens elements.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex critical point in an off-axis region thereof.

The IR-cut filter 670 is made of glass material and located between the sixth lens element 660 and the image surface 680, and will not affect the focal length of the photographing lens assembly. The image sensor 690 is disposed on or near the image surface 680 of the photographing lens assembly.

The detailed optical data of the 6th embodiment are shown in Table 11 and the aspheric surface data are shown in Table 12 below.

TABLE 11

6th Embodiment
f = 2.14 mm, Fno = 2.40, HFOV = 98.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 19.173 | | 2.510 | Glass | 1.804 | 46.5 | −6.20 |
| 2 | | 3.728 | | 4.218 | | | | |
| 3 | Lens 2 | −6.372 | (ASP) | 3.800 | Plastic | 1.639 | 23.5 | 22.98 |
| 4 | | −5.477 | (ASP) | 2.712 | | | | |
| 5 | Ape. Stop | Plano | | −0.151 | | | | |
| 6 | Lens 3 | 2.766 | (ASP) | 1.800 | Plastic | 1.535 | 55.7 | 2.80 |
| 7 | | −2.535 | (ASP) | 0.080 | | | | |
| 8 | Lens 4 | −7.902 | (ASP) | 0.718 | Plastic | 1.639 | 23.5 | −3.27 |
| 9 | | 2.936 | (ASP) | 0.387 | | | | |
| 10 | Lens 5 | −7.388 | (ASP) | 1.115 | Plastic | 1.535 | 55.7 | 4.00 |
| 11 | | −1.747 | (ASP) | 0.636 | | | | |
| 12 | Lens 6 | −3.971 | (ASP) | 0.550 | Plastic | 1.639 | 23.5 | −4.94 |
| 13 | | 16.198 | (ASP) | 0.800 | | | | |
| 14 | IR-cut filter | Plano | | 0.210 | Glass | 1.517 | 64.2 | — |

TABLE 11-continued

6th Embodiment
f = 2.14 mm, Fno = 2.40, HFOV = 98.7 deg.

| Surface # | | Curvature Radius | Thickness | Material | Index | Abbe # | Focal Length |
|---|---|---|---|---|---|---|---|
| 15 | | Plano | 0.612 | | | | |
| 16 | Image | Plano | — | | | | |

Note:
Reference wavelength is 587.6 nm (d-line).

TABLE 12

Aspheric Coefficients

| Surface # | 3 | 4 | 6 | 7 | 8 |
|---|---|---|---|---|---|
| k = | −2.5573E+00 | −4.0093E−01 | −6.8626E−01 | 1.8609E−01 | −8.9112E+01 |
| A4 = | −2.4884E−03 | 7.0752E−04 | 1.4641E−03 | −9.0324E−04 | −7.9042E−02 |
| A6 = | 5.1867E−05 | 1.8356E−05 | 3.2710E−03 | −2.7663E−02 | −1.7291E−02 |
| A8 = | 1.7218E−06 | −4.8022E−07 | −9.7552E−03 | 2.4701E−02 | 9.4610E−03 |
| A10 = | −8.7788E−08 | — | 7.4727E−03 | −1.2454E−02 | 6.5752E−03 |
| A12 = | — | — | −3.0934E−03 | 2.1397E−03 | −7.3413E−03 |
| A14 = | — | — | — | — | 1.8922E−03 |

| Surface # | 9 | 10 | 11 | 12 | 13 |
|---|---|---|---|---|---|
| k = | −3.8239E−01 | −9.0000E+01 | −2.0708E+00 | −1.4566E+01 | −2.1909E+01 |
| A4 = | −1.2888E−02 | 5.8161E−03 | 1.7969E−02 | 1.1470E−02 | −9.4010E−03 |
| A6 = | −3.9758E−03 | 4.6710E−02 | 2.4621E−03 | −4.3964E−04 | 1.6705E−03 |
| A8 = | 1.6479E−03 | −2.7001E−02 | 4.9743E−03 | −3.7745E−04 | −3.3511E−04 |
| A10 = | −7.2362E−05 | 6.7683E−03 | −1.5108E−03 | 7.5023E−05 | 3.5006E−05 |
| A12 = | — | −6.8677E−04 | 1.0696E−04 | −4.1965E−06 | −1.5869E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.14 | (R1 + R2)/(R1 − R2) | 1.48 |
| Fno | 2.40 | |(R3 − R4)/(R3 + R4)| | 0.08 |
| f/EPD | 2.40 | |f1/f2| | 0.27 |
| HFOV [deg.] | 98.7 | f3/f5 | 0.70 |
| CRA_1.0Y [deg.] | 29.9 | f12/f | −9.93 |
| HFOV/CRA_1.0Y | 3.31 | f/f123 | 1.83 |
| V4 + V6 | 47.00 | f/f456 | −0.50 |
| CTmax/CT2 | 1.00 | f123/f456 | −0.27 |
| T56/(T34 + T45) | 1.36 | FOV [deg.] | 197.4 |
| Dr1r6/Dr7r12 | 4.37 | |f123/f1| + |f123/f2| + |f123/f3| | 0.66 |
| Td/BL | 11.33 | — | — |

7th Embodiment

Figure 13:
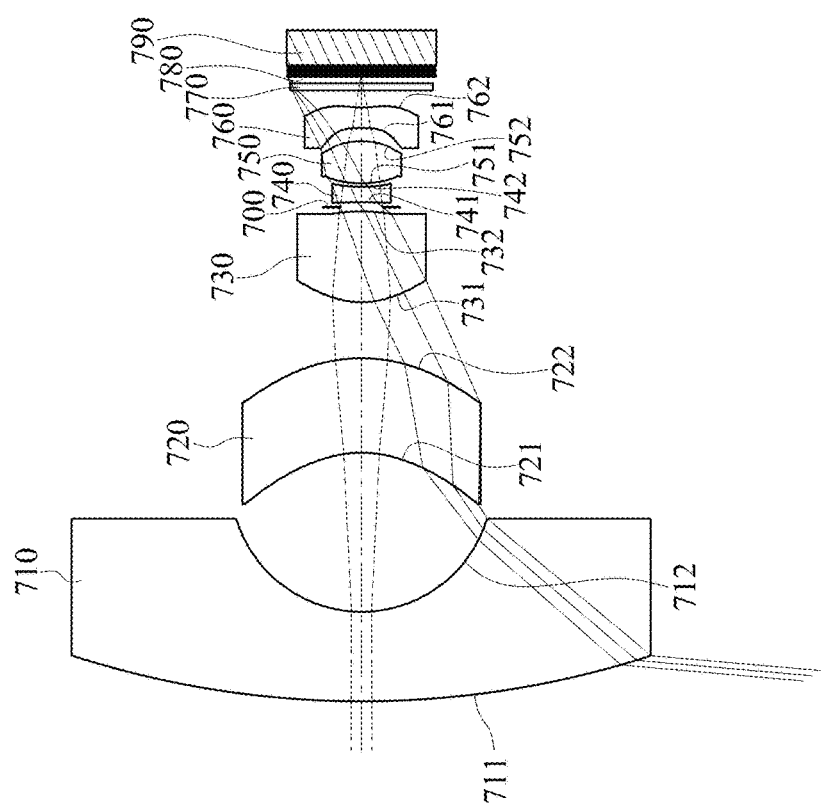
FIG. 13 is a schematic view of an image capturing unit according to the 7th embodiment of the present disclosure.
Figure 14:
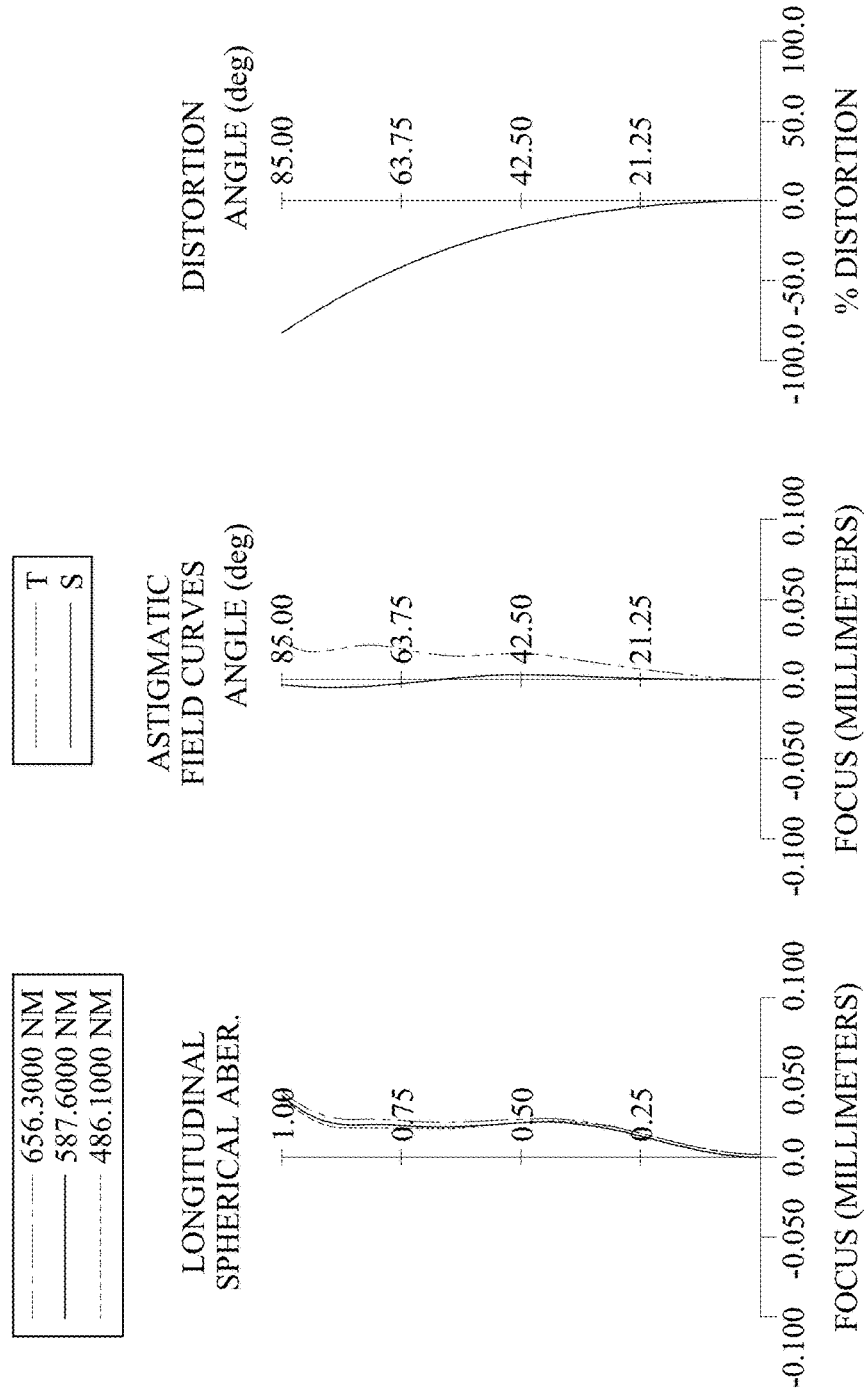
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 790. The photographing lens assembly includes, in order from an object side to an image side, a first lens element 710, a second lens element 720, a third lens element 730, an aperture stop 700, a fourth lens element 740, a fifth lens element 750, a sixth lens element 760, an IR-cut filter 770 and an image surface 780. The photographing lens assembly includes six single and non-cemented lens elements (710, 720, 730, 740, 750 and 760) with no additional lens element disposed between each of the six adjacent lens elements.

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex critical point in an off-axis region thereof.

The IR-cut filter 770 is made of glass material and located between the sixth lens element 760 and the image surface 780, and will not affect the focal length of the photographing lens assembly. The image sensor 790 is disposed on or near the image surface 780 of the photographing lens assembly.

The detailed optical data of the 7th embodiment are shown in Table 13 and the aspheric surface data are shown in Table 14 below.

TABLE 13

7th Embodiment
f = 1.47 mm, Fno = 2.35, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 27.421 | | 2.613 | Glass | 1.729 | 54.7 | −6.40 |
| 2 | | 3.830 | | 4.653 | | | | |
| 3 | Lens 2 | −3.312 | (ASP) | 2.774 | Plastic | 1.544 | 55.9 | −49.12 |
| 4 | | −4.896 | (ASP) | 1.636 | | | | |
| 5 | Lens 3 | 2.517 | (ASP) | 2.655 | Plastic | 1.515 | 56.5 | 3.55 |
| 6 | | −4.262 | (ASP) | 0.122 | | | | |
| 7 | Ape. Stop | Plano | | 0.145 | | | | |
| 8 | Lens 4 | −10.950 | (ASP) | 0.450 | Plastic | 1.669 | 19.5 | −4.58 |
| 9 | | 4.317 | (ASP) | 0.099 | | | | |
| 10 | Lens 5 | 2.538 | (ASP) | 1.248 | Plastic | 1.544 | 55.9 | 2.60 |
| 11 | | −2.643 | (ASP) | 0.384 | | | | |
| 12 | Lens 6 | −17.035 | (ASP) | 0.600 | Plastic | 1.669 | 19.5 | −3.04 |
| 13 | | 2.340 | (ASP) | 0.500 | | | | |
| 14 | IR-cut filter | Plano | | 0.210 | Glass | 1.517 | 64.2 | — |
| 15 | | Plano | | 0.191 | | | | |
| 16 | Image | Plano | | — | | | | |

Note:
Reference wavelength is 587.6 nm (d-line).

TABLE 14

Aspheric Coefficients

| Surface # | 3 | 4 | 5 | 6 | 8 |
|---|---|---|---|---|---|
| k = | −2.3161E+00 | −2.4321E+00 | −3.3630E+00 | −1.1747E+00 | −9.9000E+01 |
| A4 = | 1.3716E−03 | −3.6808E−03 | 1.2914E−02 | 3.1405E−02 | −1.6756E−02 |
| A6 = | −6.0493E−04 | 2.6128E−04 | −3.0845E−03 | −4.6979E−02 | 4.0541E−01 |
| A8 = | 6.1480E−05 | −1.0509E−05 | 3.4123E−04 | 1.7954E−01 | −1.7172E+00 |
| A10 = | −3.0996E−06 | 1.2817E−07 | 1.4984E−05 | −3.6676E−01 | 3.8155E+00 |
| A12 = | 7.1985E−08 | 8.3833E−09 | — | 3.7830E−01 | −3.3609E+00 |
| A14 = | — | — | — | −1.5130E−01 | — |

| | 9 | 10 | 11 | 12 | 13 |
|---|---|---|---|---|---|
| A16 = | | | | | |
| k = | 5.5245E+00 | −1.4662E−01 | −1.2692E+00 | 9.9000E+01 | −2.1176E+01 |
| A4 = | −1.2418E−01 | −1.6997E−01 | −2.0524E−01 | −5.3777E−01 | −2.1347E−01 |
| A6 = | 3.8903E−01 | 3.8628E−01 | 3.0805E−01 | 4.1456E−01 | 1.6505E−01 |
| A8 = | −7.5932E−01 | −7.3728E−01 | −6.1782E−01 | −4.4338E−01 | −1.1223E−01 |
| A10 = | 1.4539E+00 | 1.2643E+00 | 9.2138E−01 | 3.8106E−01 | 5.3467E−02 |
| A12 = | −1.6267E+00 | −1.3303E+00 | −8.4794E−01 | −1.8542E−01 | −1.5623E−02 |
| A14 = | 6.4015E−01 | 7.3072E−01 | 4.3034E−01 | 3.9044E−02 | 2.4861E−03 |
| A16 = | — | −1.6346E−01 | −8.7703E−02 | 4.1986E−04 | −1.6165E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.47 | (R1 + R2)/(R1 − R2) | 1.32 |
| Fno | 2.35 | \|(R3 − R4)/(R3 + R4)\| | 0.19 |
| f/EPD | 2.35 | \|f1/f2\| | 0.13 |
| HFOV [deg.] | 85.0 | f3/f5 | 1.37 |
| CRA_1.0Y [deg.] | 35.4 | f12/f | −4.27 |
| HFOV/CRA_1.0Y | 2.40 | f/f123 | 0.94 |
| V4 + V6 | 39.00 | f/f456 | −0.11 |
| CTmax/CT2 | 1.00 | f123/f456 | −0.12 |
| T56/(T34 + T45) | 1.05 | FOV [deg.] | 170.0 |
| Dr1r6/Dr7r12 | 5.15 | \|f123/f1\| + \|f123/f2\| + \|f123/f3\| | 0.71 |
| Td/BL | 19.29 | — | — |

8th Embodiment

Figure 15:
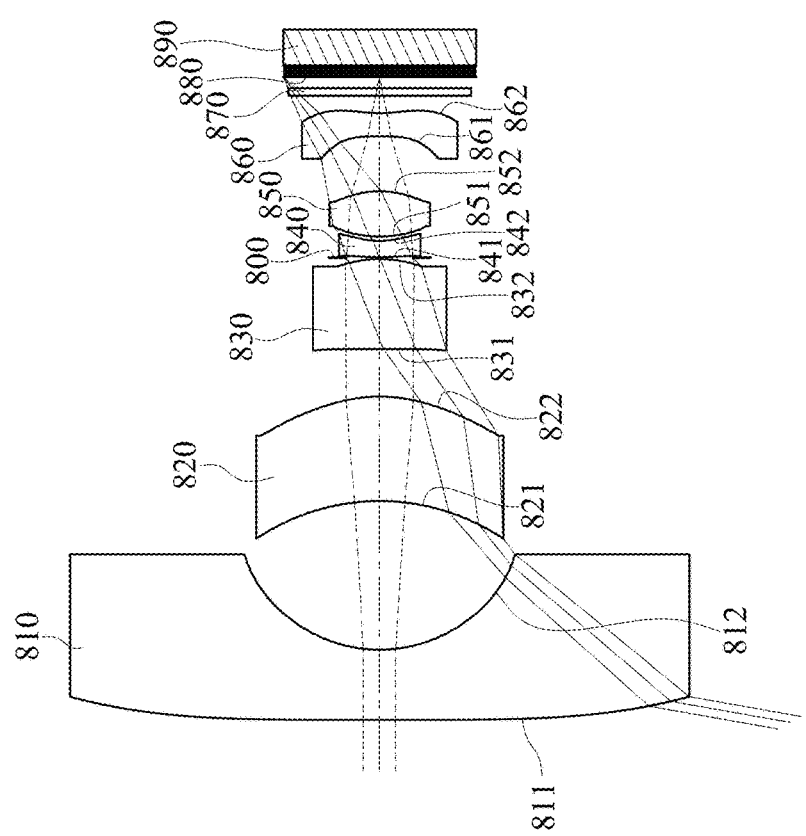
FIG. 15 is a schematic view of an image capturing unit according to the 8th embodiment of the present disclosure.
Figure 16:
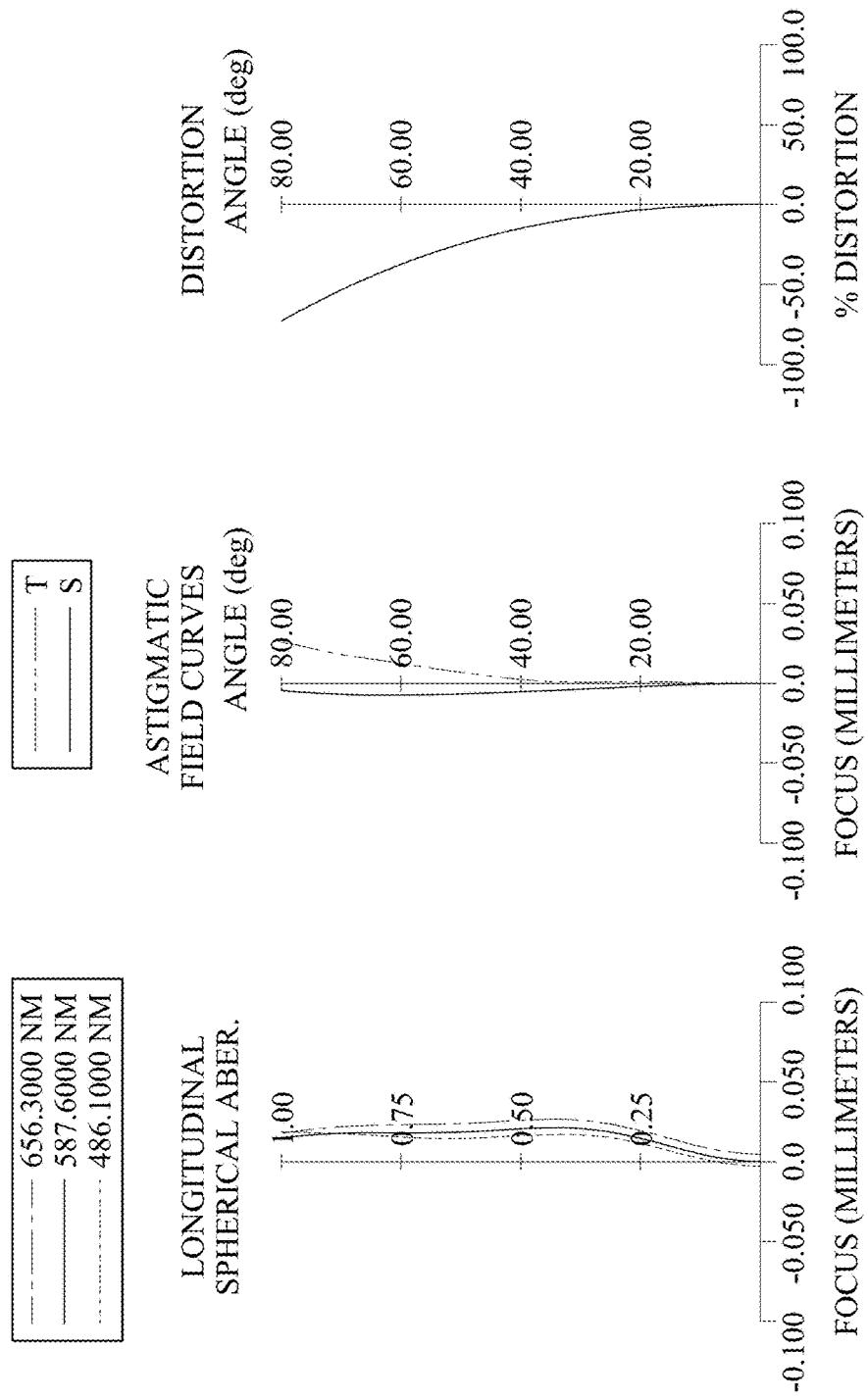
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 890. The photographing lens assembly includes, in order from an object side to an image side, a first lens element 810, a second lens element 820, a third lens element 830, an aperture stop 800, a fourth lens element 840, a fifth lens element 850, a sixth lens element 860, an IR-cut filter 870 and an image surface 880. The photographing lens assembly includes six single and non-cemented lens elements (810, 820, 830, 840, 850 and 860) with no additional lens element disposed between each of the six adjacent lens elements.

The first lens element 810 with negative refractive power has an object-side surface 811 being planar in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex critical point in an off-axis region thereof.

The IR-cut filter 870 is made of glass material and located between the sixth lens element 860 and the image surface 880, and will not affect the focal length of the photographing lens assembly. The image sensor 890 is disposed on or near the image surface 880 of the photographing lens assembly.

The detailed optical data of the 8th embodiment are shown in Table 15 and the aspheric surface data are shown in Table 16 below.

TABLE 15

8th Embodiment
f = 2.06 mm, Fno = 2.22, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | ∞ | (ASP) | 2.000 | Plastic | 1.545 | 56.0 | −7.55 |
| 2 | | 4.114 | (ASP) | 4.244 | | | | |
| 3 | Lens 2 | −6.188 | (ASP) | 2.998 | Plastic | 1.603 | 28.5 | 13.94 |
| 4 | | −4.214 | (ASP) | 1.356 | | | | |
| 5 | Lens 3 | −123.132 | (ASP) | 2.570 | Plastic | 1.534 | 55.9 | 5.81 |
| 6 | | −3.050 | (ASP) | 0.036 | | | | |
| 7 | Ape. Stop | Plano | | 0.014 | | | | |
| 8 | Lens 4 | 5.953 | (ASP) | 0.463 | Plastic | 1.660 | 20.4 | −5.20 |
| 9 | | 2.110 | (ASP) | 0.126 | | | | |
| 10 | Lens 5 | 3.330 | (ASP) | 1.289 | Plastic | 1.511 | 56.8 | 3.19 |
| 11 | | −2.772 | (ASP) | 1.589 | | | | |
| 12 | Lens 6 | −18.209 | (ASP) | 0.660 | Plastic | 1.642 | 22.5 | −4.42 |
| 13 | | 3.410 | (ASP) | 0.500 | | | | |

TABLE 15-continued

8th Embodiment
f = 2.06 mm, Fno = 2.22, HFOV = 80.0 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.318 | | | | |
| 16 | Image | Plano | — | | | | |

Note:
Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | 0.0000E+00 | 6.3228E−02 | −1.4438E+00 | −5.3030E+00 | −6.0967E+01 | −1.8976E+01 |
| A4 = | 1.2285E−04 | −3.6603E−04 | −8.9834E−05 | −1.8594E−03 | 3.0350E−03 | −4.1868E−02 |
| A6 = | −8.5357E−07 | −1.3636E−05 | −1.0094E−04 | 3.9141E−07 | −2.6810E−03 | 2.6338E−02 |
| A8 = | 4.0014E−08 | 4.5690E−07 | 5.2379E−06 | 5.4887E−06 | 5.2012E−04 | −1.8670E−02 |
| A10 = | −8.7716E−10 | −5.7740E−07 | −4.4783E−08 | −2.9029E−07 | −5.5085E−05 | 8.1293E−03 |
| A12 = | 9.3818E−12 | 6.7356E−08 | −1.2795E−09 | 6.6786E−09 | — | −1.6439E−03 |
| A14 = | −5.3270E−14 | −3.7706E−09 | — | — | — | 7.7638E−05 |
| A16 = | 1.3694E−16 | 9.1736E−11 | — | — | — | — |

| Surface # | 8 | 9 | 10 | 11 | 12 | 13 |
|---|---|---|---|---|---|---|
| k = | −8.6504E+01 | −3.9405E+00 | 2.5846E+00 | −5.9429E+00 | −4.1228E+01 | −1.7884E+01 |
| A4 = | −1.0368E−02 | −7.2989E−02 | −3.5671E−02 | −3.9517E−02 | −1.1534E−01 | −5.5881E−02 |
| A6 = | −2.8505E−02 | 6.7755E−02 | 3.9026E−02 | 1.8505E−02 | 3.7559E−02 | 1.7326E−02 |
| A8 = | 1.6609E−02 | −5.1059E−02 | −2.8550E−02 | −1.1547E−02 | −1.9880E−02 | −5.1881E−03 |
| A10 = | −7.8743E−03 | 2.1444E−02 | 1.5253E−02 | 9.9777E−03 | 8.6809E−03 | 1.0428E−03 |
| A12 = | 1.2864E−03 | −5.5859E−03 | −5.9481E−03 | −4.5391E−03 | −2.5098E−03 | −1.3195E−04 |
| A14 = | — | 6.4760E−04 | 1.3935E−03 | 1.3704E−03 | 4.1074E−04 | 9.5945E−06 |
| A16 = | — | — | −1.3724E−04 | −1.6007E−04 | −2.7093E−05 | −2.8593E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.06 | (R1 + R2)/(R1 − R2) | 1.00 |
| Fno | 2.22 | |(R3 − R4)/(R3 + R4)| | 0.19 |
| f/EPD | 2.22 | |f1/f2| | 0.54 |
| HFOV [deg.] | 80.0 | f3/f5 | 1.82 |
| CRA_1.0Y [deg.] | 37.9 | f12/f | 32.17 |
| HFOV/CRA_1.0Y | 2.11 | f/f123 | 0.76 |
| V4 + V6 | 42.90 | f/f456 | −0.04 |
| CTmax/CT2 | 1.00 | f123/f456 | −0.05 |
| T56/(T34 + T45) | 9.03 | FOV [deg.] | 160.0 |
| Dr1r6/Dr7r12 | 3.19 | |f123/f1| + |f123/f2| + |f123/f3| | 1.02 |
| Td/BL | 16.87 | — | — |

9th Embodiment

Figure 17:
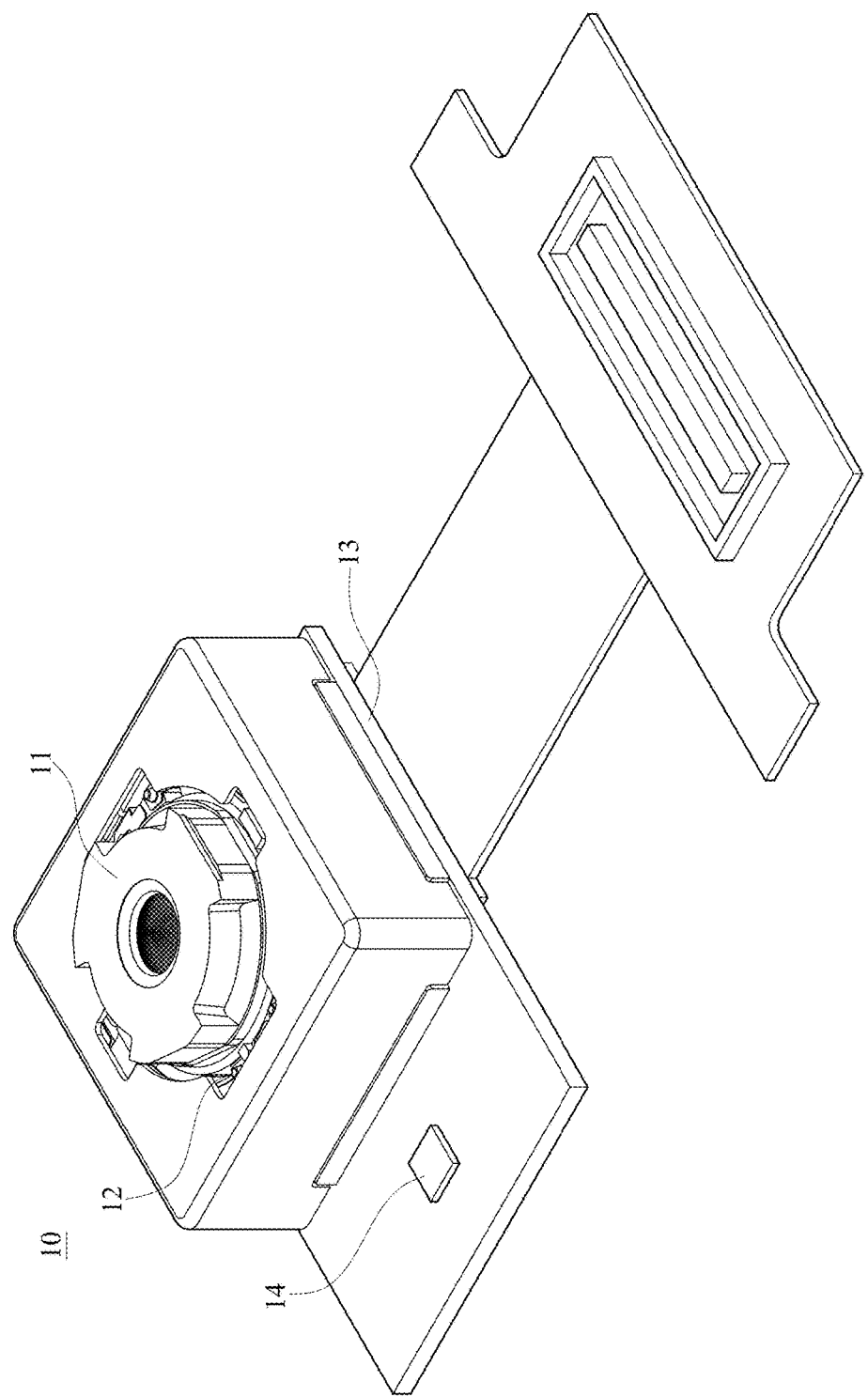
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The imaging light converges into the lens unit 11 of the image capturing unit 10 to generate an image with the driving device 12 utilized for focusing the image on the image sensor 13, and the generated image is then digitally transmitted to other electronic component for further processing.

The driving device 12 can have auto focusing functionality, and different driving configurations can be obtained through the use of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing lens assembly to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
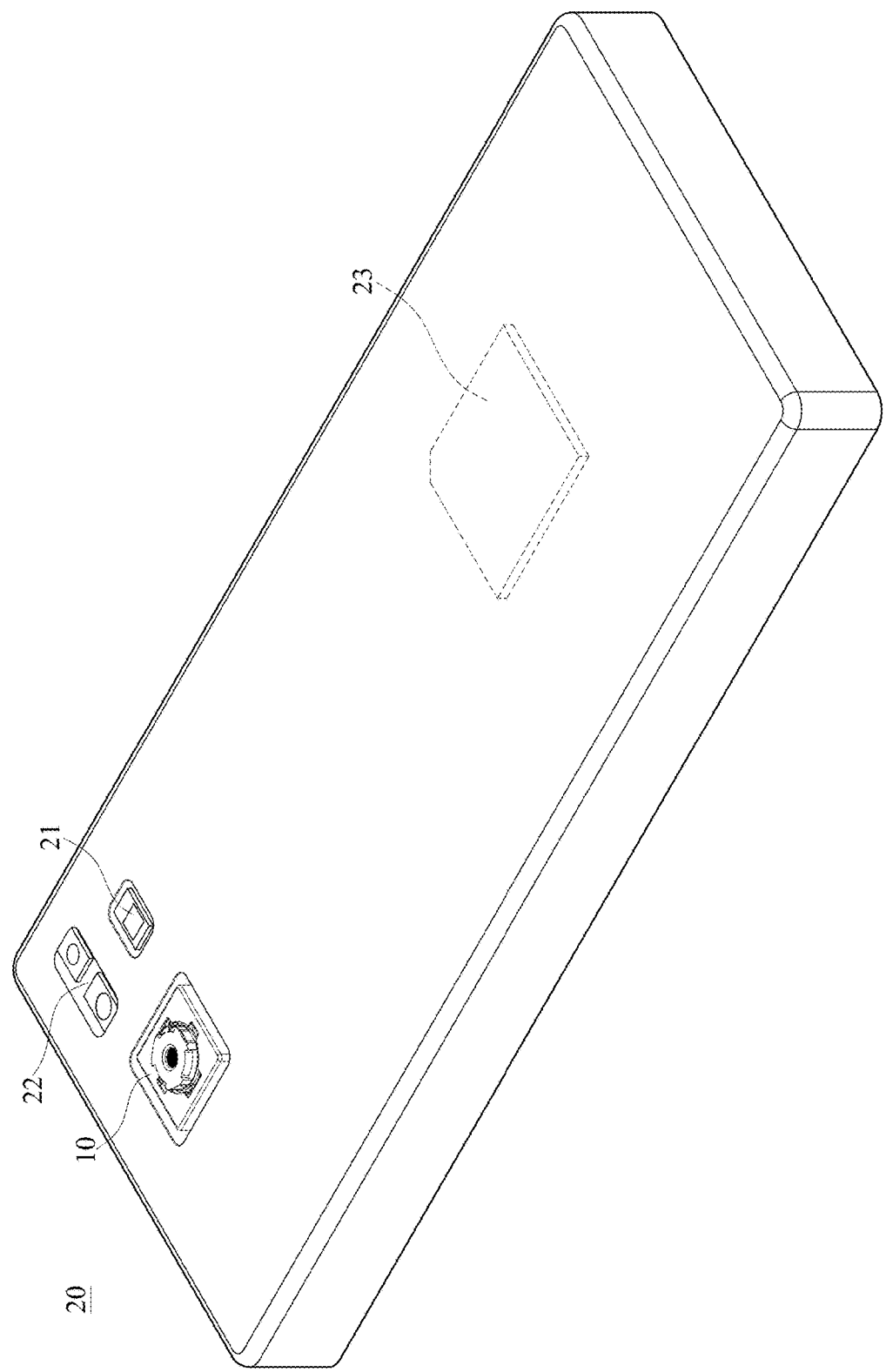
FIG. 18 is one perspective view of an electronic device according to the 10th embodiment of the present disclosure.
Figure 19:
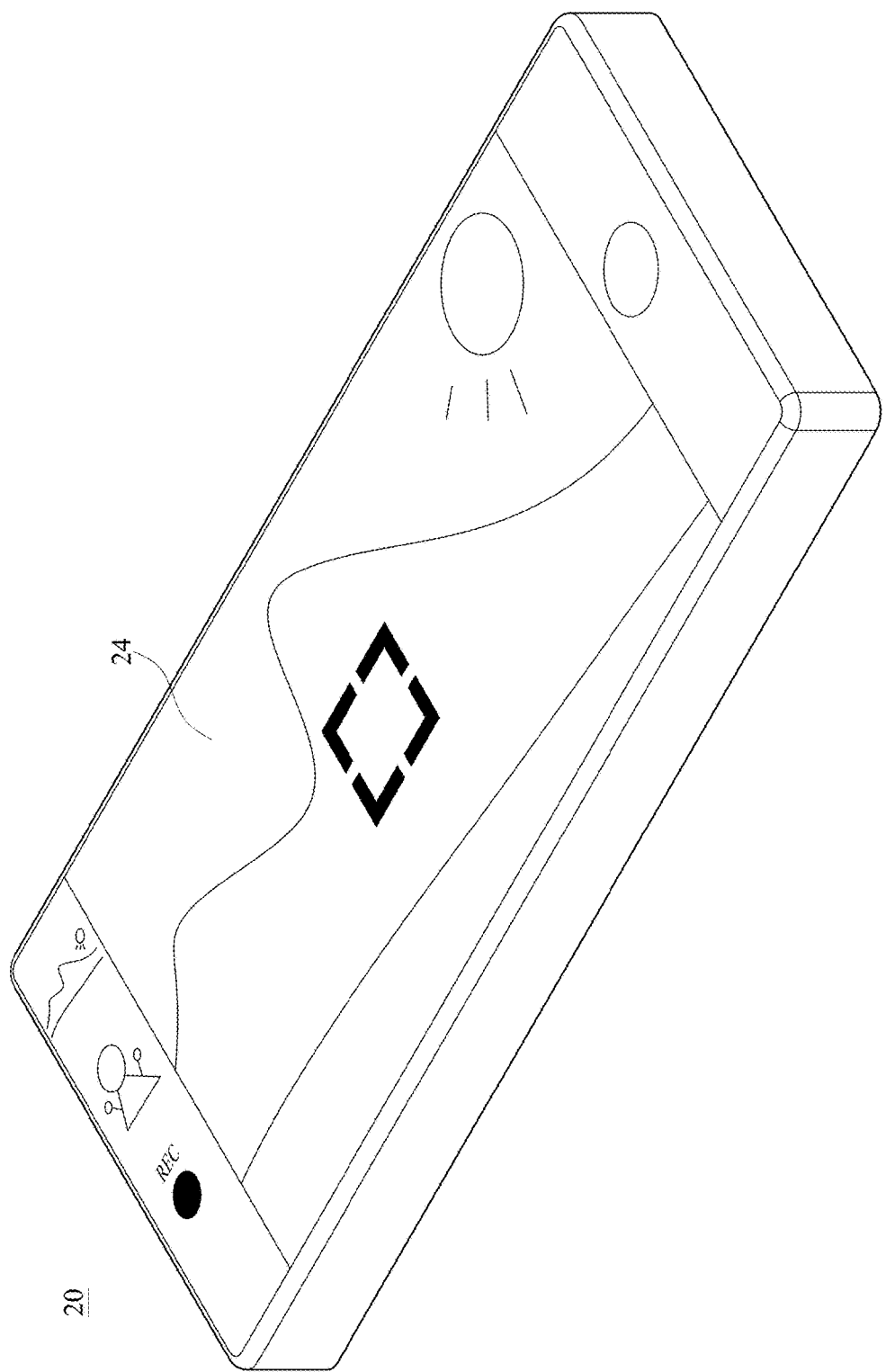
FIG. 19 is another perspective view of the electronic device in FIG. 18.
Figure 20:
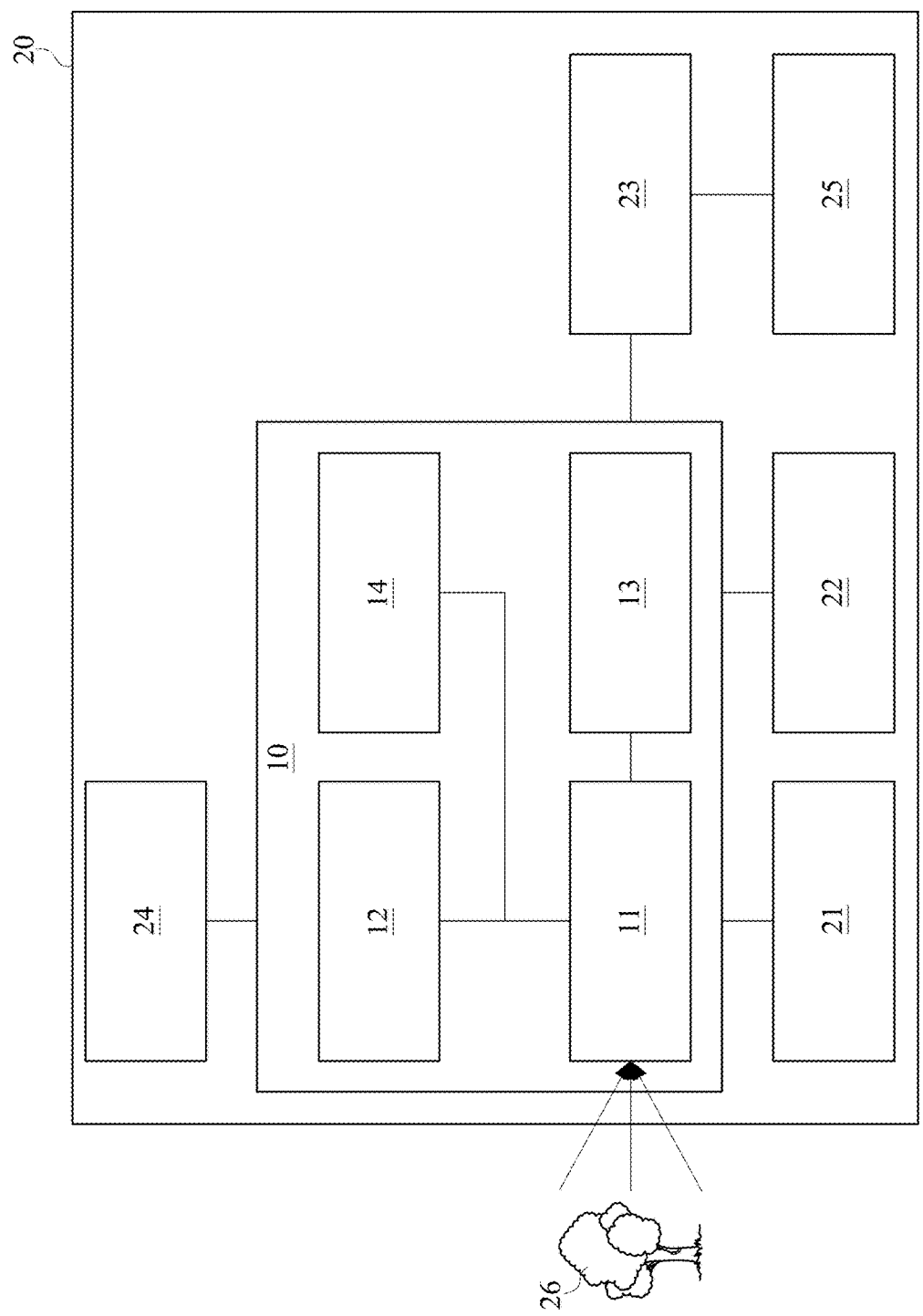
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18. In this embodiment, an electronic device 20 is a smartphone including the image capturing unit 10 disclosed in the 9th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 can include the image capturing unit 10 and one or more image capturing units of different configurations.

When a user captures the images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 features good capability in aberration corrections and high image quality, and can be applied to 3D (three-dimensional) image capturing applications, in products such as digital cameras, mobile devices, digital tablets, multi-camera devices, wearable devices, smart televisions, network surveillance devices, motion sensing input devices, dashboard cameras, vehicle backup cameras and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising six lens elements, the six lens elements being, in order from an object side to an image side:
    a first lens element with negative refractive power having an image-side surface being concave in a paraxial region thereof;
    a second lens element;
    a third lens element;
    a fourth lens element;
    a fifth lens element; and
    a sixth lens element having an image-side surface being concave in a paraxial region thereof, wherein the image-side surface of the sixth lens element has at least one convex critical point in an off-axis region thereof, and both an object-side surface and the image-side surface of the sixth lens element are aspheric;
    wherein a focal length of the photographing lens assembly is f, a focal length of the third lens element is f3, a focal length of the fifth lens element is f5, a composite focal length of the first lens element, the second lens element and the third lens element is f123, a composite focal length of the fourth lens element, the fifth lens element and the sixth lens element is f456, an axial distance between an object-side surface of the first lens element and the image-side surface of the sixth lens element is Td, an axial distance between the image-side surface of the sixth lens element and an image surface is BL, and the following conditions are satisfied:

$$f/f456<0<f/f123,$$

$$10<Td/BL, \text{ and}$$

$$0.60<f3/f5.$$

2. The photographing lens assembly of claim 1, wherein the second lens element has an image-side surface being convex in a paraxial region thereof.

3. The photographing lens assembly of claim 1, wherein the axial distance between the object-side surface of the first lens element and the image-side surface of the sixth lens element is Td, the axial distance between the image-side surface of the sixth lens element and the image surface is BL, and the following condition is satisfied:

$$12.5<Td/BL<30.$$

4. The photographing lens assembly of claim 1, wherein the focal length of the third lens element is f3, the focal length of the fifth lens element is f5, and the following condition is satisfied:

$$0.80<f3/f5<3.0.$$

5. The photographing lens assembly of claim 1, wherein the focal length of the photographing lens assembly is f, the composite focal length of the first lens element, the second lens element and the third lens element is f123, and the following condition is satisfied:

$$0.50<f/f123<1.50.$$

6. The photographing lens assembly of claim 1, wherein each of the six lens elements of the photographing lens assembly is a single and non-cemented lens element.

7. The photographing lens assembly of claim 1, wherein the focal length of the photographing lens assembly is f, a composite focal length of the first lens element and the second lens element is f12, and the following condition is satisfied:

$$5.0<f12/f.$$

8. The photographing lens assembly of claim 1, wherein the third lens element has positive refractive power, the fourth lens element has negative refractive power, the fifth lens element has positive refractive power, and the sixth lens element has negative refractive power.

9. The photographing lens assembly of claim 1, wherein a focal length of the first lens element is f1, a focal length of the second lens element is f2, and the following condition is satisfied:

$$|f1/f2|<0.90.$$

10. The photographing lens assembly of claim 1, wherein the composite focal length of the first lens element, the second lens element and the third lens element is f123, the composite focal length of the fourth lens element, the fifth lens element and the sixth lens element is f456, and the following condition is satisfied:

$-0.45 < f123/f456 < 0.$

11. The photographing lens assembly of claim 1, wherein the focal length of the photographing lens assembly is f, an entrance pupil diameter of the photographing lens assembly is EPD, and the following condition is satisfied:

$1.20 < f/EPD < 2.80.$

12. The photographing lens assembly of claim 1, wherein an axial distance between the third lens element and the fourth lens element is T34, an axial distance between the fourth lens element and the fifth lens element is T45, an axial distance between the fifth lens element and the sixth lens element is T56, and the following condition is satisfied:

$1.75 < T56/(T34+T45) < 10.$

13. The photographing lens assembly of claim 1, wherein a focal length of the first lens element is f1, a focal length of the second lens element is f2, the focal length of the third lens element is f3, the composite focal length of the first lens element, the second lens element and the third lens element is f123, and the following condition is satisfied:

$|f123/f1| + |f123/f2| + |f123/f3| < 1.0.$

14. The photographing lens assembly of claim 1, wherein a curvature radius of an object-side surface of the second lens element is R3, a curvature radius of an image-side surface of the second lens element is R4, and the following condition is satisfied:

$|(R3-R4)/(R3+R4)| < 0.40.$

15. The photographing lens assembly of claim 1, wherein a central thickness of the second lens element is CT2, a maximum value among central thicknesses of the six lens elements of the photographing lens assembly is CTmax, and the following condition is satisfied:

$1.0 \leq CTmax/CT2 < 1.20.$

16. The photographing lens assembly of claim 1, wherein a curvature radius of the object-side surface of the first lens element is R1, a curvature radius of the image-side surface of the first lens element is R2, and the following condition is satisfied:

$0.5 < (R1+R2)/(R1-R2) < 2.0.$

17. The photographing lens assembly of claim 1, wherein an Abbe number of the fourth lens element is V4, an Abbe number of the sixth lens element is V6, and the following condition is satisfied:

$V4+V6 < 60.$

18. The photographing lens assembly of claim 1, wherein an axial distance between the object-side surface of the first lens element and an image-side surface of the third lens element is Dr1r6, an axial distance between an object-side surface of the fourth lens element and the image-side surface of the sixth lens element is Dr7r12, and the following condition is satisfied:

$3.0 < Dr1r6/Dr7r12 < 6.0.$

19. The photographing lens assembly of claim 1, wherein half of a maximum field of view of the photographing lens assembly is HFOV, a chief ray angle at a maximum image height of the photographing lens assembly is CRA_1.0Y, and the following condition is satisfied:

$1.75 < HFOV/CRA\_1.0Y < 3.0.$

20. The photographing lens assembly of claim 1, wherein a maximum field of view of the photographing lens assembly is FOV, and the following condition is satisfied:

$135 \text{ [deg.]} < FOV < 220 \text{ [deg.]}.$

21. An image capturing unit, comprising:
the photographing lens assembly of claim 1; and
an image sensor disposed on the image surface of the photographing lens assembly.

22. An electronic device, comprising:
the image capturing unit of claim 21.

* * * * *